US006195425B1

(12) United States Patent
Farris

(10) Patent No.: US 6,195,425 B1
(45) Date of Patent: Feb. 27, 2001

(54) TELECOMMUNICATIONS SYSTEM WITH WIDE AREA INTERNETWORK CONTROL

(75) Inventor: Robert D. Farris, Sterling, VA (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 08/753,198

(22) Filed: Nov. 21, 1996

(51) Int. Cl.[7] .............................. H04M 7/00; H04J 3/02; H04J 3/12

(52) U.S. Cl. .......................... 379/230; 370/385; 370/401; 370/467; 370/496; 370/522; 379/220; 379/224; 379/900

(58) Field of Search .................... 379/112, 201, 379/207, 219, 220, 224, 229, 230, 900; 370/384, 385, 522, 401, 467, 496

(56) References Cited

U.S. PATENT DOCUMENTS

| | | | |
|---|---|---|---|
| 5,247,571 | * 9/1993 | Kay et al. | 379/207 |
| 5,469,500 | * 11/1995 | Satter et al. | 379/207 X |
| 5,572,583 | * 11/1996 | Wheeler, Jr. et al. | 379/112 X |
| 5,590,133 | 12/1996 | Billström et al. | 370/349 |
| 5,608,786 | 3/1997 | Gordon | 370/352 |
| 5,661,790 | * 8/1997 | Hsu | 379/230 X |
| 5,706,286 | 1/1998 | Reiman et al. | 370/401 |
| 5,724,355 | 3/1998 | Bruno et al. | 370/401 |
| 5,726,984 | 3/1998 | Kubler et al. | 370/349 |
| 5,751,707 | * 5/1998 | Voit et al. | 370/384 |
| 5,793,762 | 8/1998 | Penners et al. | 370/389 |

OTHER PUBLICATIONS

Mills, Mike, "Freebie Heebie–Jeebies: New Long–Distance Calling Via the Internet Scares Small Phone Firms", *The Washington Post*, Mar. 8, 1996, Section F. pp. 1–2.

Hughes, David T., "What hath (net) god wrought?", *The Journal* (Fairfax, Virginia), Feb. 21, 1995, Section B, pp. 1–2.

Hughes, David T., Webphone heading for serious telephony, *The Journal* (Fairfax, Virginia), May 28, 1996, Section A, pp. 8.

Mills, Mike, "It's the Net's Best Thing to Being There: With Right Software, Computer Becomes a Toll–Free Telephone", *The Washington Post*, Jan. 23, 1996, Section C, pp. 1,5.

Hughes, David T., "Internet phone wars heating up: Companies improve and encourage users to test products", *The Journal* (Fairfax, Virginia), Jan. 2, 1996, Section A, pp. 6.

Yang, C., "INETPhone: Telephone Services and Servers on Internet", http://ds.internic.net/rfc/rfc1789.txt.

Kuehn, Richard A., "The Voice of Technology", (Online text only) *Credit World*, Jul. 1994, vol. 82, No. 6, pp. 20–23.

Margulies, Edwin, "Understanding the Voice–Enabled Internet", Flatiron Publishing, Inc. pp. 4–42 and 12–1 to 12–3.

* cited by examiner

*Primary Examiner*—Harry S. Hong
(74) *Attorney, Agent, or Firm*—McDermott, Will & Emery

(57) ABSTRACT

A communications system including multiple telecommunications networks having common channel signaling hardware is controlled by a hybrid or combination of common channel interoffice signaling (CCIS) system with a data internetwork to link the signaling points in the telecommunications network via the new hybrid common channel interoffice switching system. Preferably the internetwork comprises the Internet. The internet is used to link signal switching points, signal transfer points, and a signal control point. The signal control point is preferably hierarchical and distributed so as to provide ample power and capacity to supply signal control for multiple telecommunications networks of related or unrelated operating companies. It is an important feature of the invention that multiple telecommunications networks may be controlled from a central control point by using a hybrid form of common channel signaling in which signaling points in the telecommunications networks operate with signaling protocols for which they are presently designed while the control signaling between signaling points is transported by pre-existing internetwork signals using a different protocol for which the internetwork is designed.

21 Claims, 11 Drawing Sheets

TELECOMMUNICATIONS SYSTEM WITH WIDE AREA INTERNETWORK CONTROL

TECHNICAL FIELD

The present invention relates to a telecommunications system and more particularly relates to a public switched telecommunications network having a control signaling system which provides wide area national and international routing and supervision using out of band signaling which includes a wide area internetwork implemented signaling system. The following background material introduces various telephone network control and computer network concepts and definitions and those familiar with telephone network control and computer networks and TCP/IP may wish to skip to following subsections.

Acronyms

The written description uses a large number of acronyms to refer to various services, messages and system components. Although generally known, use of several of these acronyms is not strictly standardized in the art. For purposes of this discussion, acronyms therefore will be defined as follows:
Address Complete Message (ACM)
Advanced Intelligent Network (AIN)
Answer Message (ANM)
Application Service Part (ASP)
Backward Indicator Bit (BIB)
Backward Sequence Number (BSN)
Central Office (CO)
Common Channel Signaling (CCS)
Common Channel Interoffice Signaling (CCIS)
Customer Identification Code (CIC)
Cyclic Redundancy Code (CRC)
Data and Reporting System (DRS)
Destination Point Code (DPC)
Dual Tone Multifrequency (DTMF)
Fill in Signal Unit (FISU)
Global Title (GTT)
Initial Address Message (IAM)
Integrated Service Control Point (ISCP)
Integrated Services Digital Network (ISDN)
ISDN User Part (ISDN-UP)
International Standards Organization (ISO)
Link Service Signaling Unit (LSSU)
Local Access and Transport Area (LATA)
Message Signaling Unit (MSU)
Message Transfer Part (MTP)
Multi-Services Application Platform (MSAP)
Open Systems Interconnection (OSI)
Operations, Maintenance, Application Part (OMAP)
Origination Point Code (OPC)
Point in Call (PIC)
Point in Routing (PIR)
Point of Presence (POP)
Recent Change (RC)
Service Control Point (SCP)
Service Creation Environment (SCE)
Service Information Octet (SIO)
Service Management System (SMS)
Service Switching Point (SSP)
Signaling Connection Control Part (SCCP)
Signaling Link Selection (SLS)
Signaling System 7 (SS7)
Signaling Point (SP)
Signaling Transfer Point (STP)
Subsystem Number (SSN)
Time Slot Interchange (TSI)
Transaction Capabilities Applications Protocol (TCAP)

BACKGROUND

Computer Network Background

A computer network is simply a collection of autonomous computers connected together to permit sharing of hardware and software resources, and to increase overall reliability. The qualifying term "local area" is usually applied to computer networks in which the computers are located in a single building or in nearby buildings, such as on a college campus or at a single corporate site. When the computers are further apart, the terms "wide area network" or "long haul network" are used, but the distinction is one of degree and the definitions sometimes overlap.

A bridge is a device that is connected to at least two LANs and serves to pass message frames or packets between LANs, such that a source station on one LAN can transmit data to a destination station on another LAN, without concern for the location of the destination. Bridges are useful and necessary network components, principally because the total number of stations on a single LAN is limited. Bridges can be implemented to operate at a selected layer of protocol of the network. A detailed knowledge of network architecture is not needed for an understanding of this invention, but a brief description follows by way of further background.

At the heart of any computer network is a communication protocol. A protocol is a set of conventions or rules that govern the transfer of data between computer devices. The simplest protocols define only a hardware configuration, while more complex protocols define timing, data formats, error detection and correction techniques and software structures.

Computer networks almost universally employ multiple layers of protocols. A low-level physical layer protocol assures the transmission and reception of a data stream between two devices. Data packets are constructed in a data link layer. Over the physical layer, a network and transport layer protocol governs transmission of data through the network, thereby ensuring end-to end reliable data delivery.

The most common physical networking protocol or topology for small networks is Ethernet, developed by Xerox. When a node possesses a packet to be transmitted through the network, the node monitors the backbone and transmits when the backbone becomes clear. There is no central backbone master device to grant requests to gain access to the backbone. While this type of multipoint topology facilitates rapid transmission of data when the backbone is lightly utilized, packet collisions may occur when the backbone is heavily utilized. In such circumstances, there is a greater chance that multiple nodes will detect that the backbone is clear and transmit their packets coincidentally. If packets are impaired in a collision, the packets are retransmitted until transmission is successful.

Another conventional physical protocol or topology is Token Ring, developed by IBM. This topology employs a "token" that is passed unidirectionally from node to node around an annular backbone. The node possessing the token is granted exclusive access to the backbone for a single packet transfer. While this topology reduces data collisions, the latency incurred while each node waits for the token translates into a slower data transmission rate than Ethernet when the network is lightly utilized.

As computer networks have developed, various approaches have been used in the choice of communication medium, network topology, message format, protocols for channel access, and so forth. Some of these approaches have emerged as de facto standards, but there is still no single standard for network communication. However, a model for network architectures has been proposed and widely accepted. It is known as the International Standards Organization (ISO) Open Systems Interconnection (OSI) reference model. The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction.

The lowest layer defined by the OSI model is called the physical layer, and is concerned with transmitting raw data bits over the communication channel. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link that appears error-free to the next layer above, known as the network layer. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a media access control (MAC) sublayer. This sublayer determines which station should get access to the communication channel when there are conflicting requests for access. The functions of the MAC layer are more likely to be dependent on the nature of the transmission medium.

Bridges may be designed to operate in the MAC sublayer. Further details may be found in "MAC Bridges," P802.1D/D6, September 1988, a draft publication of IEEE Project 802 on Local and Metropolitan Area Network Standards, or in later drafts of this document.

The basic function of a bridge is to listen "promiscuously," i.e., to all message traffic on all LANs to which it is connected, and to forward each message it hears onto LANs other than the one from which the message was heard. Bridges also maintain a database of station locations, derived from the content of the messages being forwarded. Bridges are connected to LANs by paths known as "links." After a bridge has been in operation for some time, it can associate practically every station with a particular link connecting the bridge to a LAN, and can then forward messages in a more efficient manner, transmitting only over the appropriate link. The bridge can also recognize a message that does not need to be forwarded, because the source and destination stations are both reached through the same link. Except for its function of "learning" station locations, or at least station directions, the bridge operates basically as a message repeater.

As network topologies become more complex, with large numbers of LANs, and multiple bridges interconnecting them, operational difficulties can ensue if all possible LAN bridging connections are permitted. In particular, if several LANs are connected by bridges to form a closed loop, a message may be circulated back to the LAN from which it was originally transmitted, and multiple copies of the same message will be generated. In the worst case, messages will be duplicated to such a degree that the networks will be effectively clogged with these messages and unable to operate at all.

To prevent the formation of closed loops in bridged networks, IEEE draft publication P802.1D, referred to above, proposes a standard for a spanning tree algorithm that will connect the bridged network into a tree configuration, containing no closed loops, and spanning the entire network configuration. The spanning tree algorithm is executed periodically by the bridges on the interconnected network, to ensure that the tree structure is maintained, even if the physical configuration of the network changes. Basically, the bridges execute the spanning tree algorithm by sending special messages to each other to establish the identity of a "root" bridge. The root bridge is selected, for convenience, as the one with the smallest numerical identification. The algorithm determines which links of the bridges are to be active and which are to be inactive, i.e., disabled, in configuring the tree structure. One more piece of terminology is needed to understand how the algorithm operates. Each LAN has a "designated" link, which means that one of the links connectable to the LAN is designated to carry traffic toward and away from the root bridge. The basis for this decision is similar to the basis for selecting the root bridge. The designated link is the one providing the least costly (shortest) path to the root bridge, with numerical bridge identification being used as a tie-breaker. Once the designated links are identified, the algorithm chooses two types of links to be activated or closed: first, for each LAN its designated link is chosen, and second, for each bridge a link that forms the "best path" to the root bridge is chosen, i.e., a link through which the bridge received a message giving the identity of the root bridge. All other links are inactivated. Execution of the algorithm results in interconnection of the LANs and bridges in a tree structure, i.e., one having no closed loops.

The "Internet" is a collection of networks, including Arpanet, NSFnet, regional networks such as NYsernet, local networks at a number of university and research institutions, and a number of military networks. The protocols generally referred to as TCP/IP were originally developed for use only through Arpanet and have subsequently become widely used in the industry. The protocols provide a set of services that permit users to communicate with each other across the entire Internet. The specific services that these protocols provide are not important to the present invention, but include file transfer, remote log-in, remote execution, remote printing, computer mail, and access to network file systems.

The basic function of the Transmission Control Protocol (TCP) is to make sure that commands and messages from an application protocol, such as computer mail, are sent to their desired destinations. TCP keeps track of what is sent, and retransmits anything that does not get to its destination correctly. If any message is too long to be sent as one "datagram," TCP will split it into multiple datagrams and makes sure that they all arrive correctly and are reassembled for the application program at the receiving end. Since these functions are needed for many applications, they are collected into a separate protocol (TCP) rather than being part of each application. TCP is implemented in the transport layer of the OSI reference model.

The Internet Protocol (IP) is implemented in the network layer of the OSI reference model, and provides a basic service to TCP: delivering datagrams to their destinations. TCP simply hands IP a datagram with an intended destination; IP is unaware of any relationship between successive datagrams, and merely handles routing of each datagram to its destination. If the destination is a station connected to a different LAN, the IP makes use of routers to forward the message.

TCP/IP frequently uses a slight deviation from the seven-layer OSI model in that it may have five layers. These five layers are combinations and derivatives of the seven-layer model as shown in FIG. 1. The five layers are as follows:

Layer 5—The Application Layer. Applications such as ftp, telnet, SMTP, and NFS relate to this layer.

Layer 4—The Transport Layer. In this layer, TCP and UDP add transport data to the packet and pass it to layer 3.

Layer 3—The Internet Layer. When an action is initiated on a local host (or initiating host) that is to be performed or responded to on a remote host (or receiving host), this layer takes the package from layer 4 and adds IP information before passing it to layer 2.

Layer 2—The Network Interface Layer. This is the network device as the host, or local computer, sees it and it is through this medium that the data is passed to layer 1.

Layer 1—The Physical Layer. This is literally the Ethernet or Serial Line Interface Protocol (SLIP) itself.

At the receiving host the layers are stripped one at a time, and their information is passed to the next highest level until it again reaches the application level. If a gateway exists between the initiating and receiving hosts, the gateway takes the packet from the physical layer, passes it through a data link to the IP physical layer to continue, as is shown in FIG. 2. As a message is sent from the first host to the second, gateways pass the packet along by stripping off lower layers, readdressing the lower layer, and then passing the packet toward its final destination.

A router, like a bridge, is a device connected to two or more LANs. Unlike a bridge, however, a router operates at the network layer level, instead of the data link layer level. Addressing at the network layer level makes use of a 32-bit address field for each host, and the address field includes a unique network identifier and a host identifier within the network. Routers make use of the destination network identifier in a message to determine an optimum path from the source network to the destination network. Various routing algorithms may be used by routers to determine the optimum paths. Typically, routers exchange information about the identities of the networks to which they are connected.

When a message reaches its destination network, a data link layer address is needed to complete forwarding to the destination host. Data link layer addresses are 48 bits long and are globally unique, i.e., no two hosts, wherever located, have the same data link layer address. There is a protocol called ARP (address resolution protocol), which obtains a data link layer address from the corresponding network layer address (the address that IP uses). Typically, each router maintains a database table from which it can look up the data link layer address, but if a destination host is not in this ARP database, the router can transmit an ARP request. This message basically means: "will the host with the following network layer address please supply its data link layer address." Only the addressed destination host responds, and the router is then able to insert the correct data link layer address into the message being forwarded, and to transmit the message to its final destination.

IP routing specifies that IP datagrams travel through internetworks one hop at a time (next hop routing) based on the destination address in the IP header. The entire route is not known at the outset of the journey. Instead, at each stop, the next destination (or next hop) is calculated by matching the destination address within the datagram's IP header with an entry in the current node's (typically but not always a router) routing table.

Each node's involvement in the routing process consists only of forwarding packets based on internal information resident in the router, regardless of whether the packets get to their final destination. To extend this explanation a step further, IP routing does not alter the original datagram. In particular, the datagram source and destination addresses remain unaltered. The IP header always specifies the IP address of the original source and the IP address of the ultimate destination.

When IP executes the routing algorithm it computes a new address, the IP address of the machine/router to which the datagram should be sent next. This algorithm uses the information from the routing table entries, as well as any cached information local to the router. This new address is most likely the address of another router/gateway. If the datagram can be delivered directly (the destination network is directly attached to the current host) the new address will be the same as the destination address in the IP header.

The next hop address defined by the method above is not stored in their IP datagram. There is no reserved space to hold it and it is not "stored" at all. After executing the routing algorithm (the algorithm is specific to the vendor/platform) to define the next hop address to the final destination. The IP protocol software passes the datagram and the next hop address to the network interface software responsible for the physical network over which the datagram must now be sent.

The network interface software binds the next hop address to a physical address (this physical address is discovered via address resolution protocols (ARP, RARP, etc.), forms a frame (Ethernet, SMDS, FDDI, etc.—OSI layer 2 physical address) using the physical address, places the datagram in the data portion of the frame, and sends the result out over the physical network interface through which the next hop gateway is reached. The next gateway receives the datagram and the foregoing process is repeated.

In addition, the IP does not provide for error reporting back to the source when routing anomalies occur. This task is left to another Internet protocol, the Internet Control Message Protocol (ICMP).

A router will perform protocol translation. One example is at layers 1 and 2. If the datagram arrives via an Ethernet interface and is destined to exit on a serial line, for example, the router will strip off the Ethernet header and trailer, and substitute the appropriate header and trailer for the specific network media, such as SMDS, by way of example.

A route policy may be used instead of routing table entries to derive the next hop address. In the system and methodology of the present invention, the source address is tested to see in which ISP address range it falls. Once the ISP address range is determined the packet is then routed to the next hop address associated with the specific ISP.

Data communications network services have two categories of call establishment procedures: connection-oriented and connectionless.

Connection-oriented network services require that users establish a single distinct virtual circuit before the data can be transmitted. This circuit then defines a fixed path through the network that all traffic follows during the session. Several packet switching services are connection-oriented, notably X.25 and Frame Relay. X.25 is the slower of the services, but has built-in error correction—enough for its performance not to depend on clean, high-quality optical fiber lines. Frame relay, regarded as the first generation of fast packet technology, is well-suited for high-speed bursty data communication applications.

Connectionless network services, by contrast, let each packet of a communications session take a different, independent path through the network. One example is the Switched Multimegabit Data Service (SMDS), a possible precursor to broadband ISDN. This fast-packet service supports data rates ranging from the T1 rate of 1.544 Mb/s up to 1 Gb/s. The SMDS transport system architecture is defined by IEEE 802.6 Metropolitan Area Network standards.

Eventually, SMDS is expected to operate at rates of 51.85 Mb/s to 9.953 Gb/s specified by the family of standards known in North America as Synchronous Optical Network (SONET). Synchronous Digital Hierarchy (SDH) is an ITU recommendation that grew out of and includes the specifications of SONET.

The process of routing packets over the Internet is also considered a connectionless network service. The Internet Protocol (IP) addresses packets from sender to receiver. It is still used mostly in conjunction with the Transmission Control Protocol (TCP), which establishes a connection between end users to manage the traffic flow and ensures the data are correct, providing end-to-end reliability. The combination, known as TCP/IP, is the Internet's main backbone protocol suite.

Telephone Network Control

All telecommunications systems having multiple switching offices require signaling between the offices. Telephone networks require signaling between switching offices for transmitting routing and destination information, for transmitting alerting messages such as to indicate the arrival of an incoming call, and for transmitting supervisor information, e.g., relating to line status. Signaling between offices can use 'in-band' transport or 'out-of-band' transport.

In-band signaling utilizes the same channel that carries the communications of the parties. In a voice telephone system, for example, one of the common forms of in-band signaling between offices utilizes multifrequency signaling over voice trunk circuits. The same voice trunk circuits also carry the actual voice traffic between switching offices. In-band signaling, however, tends to be relatively slow and ties up full voice channels during the signaling operations. In telephone call processing, a substantial percentage of all calls go unanswered because the destination station is busy. For in-band signaling, the trunk to the end office switching system serving the destination is set-up and maintained for the duration of signaling until that office informs the originating office of the busy line condition. As shown by this example, in-band signaling greatly increases congestion on the traffic channels, that is to say, the voice channels in the voice telephone network example. In-band signaling also is highly susceptible to fraud because hackers have developed devices which mimic in-band signaling.

Out-of-band signaling evolved to mitigate the problems of in-band signaling. Out-of-band signaling utilizes separate channels, and in many cases separate switching elements. As such, out-of-band signaling reduces congestion on the channels carrying the actual communication traffic. Also, messages from the end users always utilize an in-band format and remain in-band, making it virtually impossible for an end user to simulate signaling messages which ride on an out-of-band channel or network. Out-of-band signaling utilizes its own signal formats and protocols and is not constrained by protocols and formats utilized for the actual communication, therefore out-of-band signaling typically is considerably faster than in-band signaling.

Out of band signaling networks typically include data links and one or more packet switching systems. Out-of-band signaling for telephone networks is often referred to as Common Channel Signaling (CCS) or Common Channel Interoffice Signaling (CCIS). Most such signaling communications for telephone networks utilizes signaling system 7 (SS7) protocol. An SS7 compliant CCIS network is a dedicated digital network used for telephone call setup and control. Each signaling point in the SS7 network is uniquely identified by a numeric point code. Point codes are carried in signaling messages exchanged between signaling points to identify the source and destination of each message. The signaling point uses a routing table to select the appropriate signaling path for each message.

There are three kinds of signaling points in the SS7 network; Service Switching Points (SSPs), Signal Transfer Points (STPs), and Service Control Points (SCPs). SSPs are switches that originate, terminate, or tandem calls. An SSP sends call setup messages to other SSPs. An SSP may also send a query message to a centralized database (an SCP) to determine how to route a call. An SCP sends a response to the originating SSP containing the routing Number(s) associated with the dialed number. Network traffic between signaling points may be routed via an STP. An STP routes each incoming message to an outgoing signaling link based on routing information contained in the SS7 message.

The STPs are program controlled packet data switching systems. In operation, an STP will receive a packet data message from another node of the network, for example from an end office switching system. The STP analyzes point code information in the packet and routes the packet according to a translation table stored within the STP. This translation table is static. Any packet having a particular point code is output on a port going to the next CCIS signaling node specified by translation of that point code.

SCPs and STPs are usually deployed in mated pair configurations to ensure network-wide service in the event of an isolated failure. Links between signaling points are also provisioned in pairs. Traffic is shared across all links in the link set. If one of the links fails, the signaling traffic is rerouted over another link in the link set. SS7 traffic is sent over 56 kb/s or 64 kb/s bidirectional signaling links.

The development of the CCIS network has recently permitted the offering of a number of new service features provided by centralized program control from a high level control point. Such an enhanced telephone network is often termed an Advanced Intelligent Network (AIN). In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via the CCIS signaling network to an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call. An AIN type network for providing an Area Wide Centrex service was disclosed and described in detail in commonly assigned U.S. Pat. No. 5,247,571 to Kay et al., the disclosure of which is entirely incorporated herein by reference. Existing AIN type systems, such as disclosed in the Kay et al. Patent, utilize the routing functionality of the STPs in the CCIS network as described above. Every time a specified switching office launches a query for an identified ISCP, the translation table in the STP(s) of the CCIS network causes the STP(s) to route the query message to that ISCP.

The CCIS and AIN which have been described provide effective and efficient connection oriented signaling between switches in modern telephone networks. However, such control is not available in the United States on a nationwide basis and is not available internationally for a variety of reasons. Connections between Interexchange Carriers (IXCs) and Local Exchange Carriers (LECs) in the United States are still made to a significant extent with in-band signaling. This requires inefficient use of circuit time of voice trunks and is vulnerable to fraud. The inefficiencies are particularly aggravated where international and particularly transoceanic communications are involved.

DISCLOSURE OF THE INVENTION

Objects of the Invention

It is an object of the present invention to provide telephone service over wide areas between different telephone systems and carriers using a new form of common channel signaling architecture which permits use of existing telecommunication signaling control facilities in conjunction with existing and readily available world wide data internetworks.

It is a further object of the invention to provide such a telecommunications system and service in a manner which obviates any need for installation of end to end connection oriented common channel signaling facilities.

It is another object of the invention to provide telephone service over wide areas between different telephone systems and carriers using common channel signaling which uses existing telecommunication control facilities in conjunction with existing open access, non-proprietary world wide data internetworks.

It is a still further object of the invention to provide a new method and system utilizing an architecture in which a destination telecommunications network having common channel signaling control is connected to an originating telecommunications network having common channel signaling control through a call set up methodology which provides ad hoc connection between the two spaced common channel signaling networks via an unrelated world wide data network which preferably constitutes the Internet.

It is another object of the present invention to provide telephone service over wide areas between different telephone systems and carriers using a new form of common channel signaling architecture which permits use of existing telecommunication signaling control facilities in conjunction with existing and readily available world wide connectionless data networks to achieve an increased redundancy and reliability of the control internetwork.

It is another object of the present invention to provide telephone service over wide areas between different telephone systems and carriers using a new form of common channel signaling architecture of a hybrid nature using multiple protocols.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention provides a novel system and method for controlling on a worldwide basis two or more telecommunications networks which are themselves capable of exercising a form of common channel signaling network control. The invention is particularly advantageous in providing telecommunications network control on a more universal basis. The new method and system use an architecture in which a destination telecommunications network having common channel signaling control is connected to an originating telecommunications network having common signaling control through a call set up methodology which provides ad hoc connection between the two spaced common channel signaling networks via an unrelated world wide data internetwork which preferably constitutes the Internet. Through this arrangement the normal CCIS signaling of the two spaced networks can be effectively utilized to obtain the advantages of common channel signaling which are known to those skilled in the art.

The invention utilizes a hybrid or combination of CCIS with a data internetwork to link the signaling points in a telecommunications network via the new hybrid common channel interoffice switching system. Preferably this internetwork comprises the Internet. In this manner virtually immediate equipment, architecture, and protocol are made available in a form which is utilized and understood on a worldwide basis. In a preferred specific example the Internet is relied upon to link signal switching points, signal transfer points, and a signal control point. The signal control point is preferably hierarchical and distributed so as to provide ample power and capacity to supply signal control for multiple telecommunications networks of related or unrelated operating companies. With such a signal control point or controller it is feasible for each company using the controller to maintain control of its allocated portion or functionality of the common controller or control point without interfering with the accessibility of all or predesignated portions of the control point or controller to all users of the internetwork.

It is an important feature of the invention that multiple telecommunications networks may be controlled from a central control point by using a hybrid form of common channel signaling in which signaling points in the telecommunications networks operate with signaling protocols for which they are presently designed while the control signaling between signaling points is transported by pre-existing internetwork signals using a different protocol for which the internetwork is designed.

BEST MODE FOR CARRYING OUT THE INVENTION

To facilitate understanding of the present invention, it will be helpful first to review the architecture and operation of a telephone network having CCIS capabilities.

Figure 3:
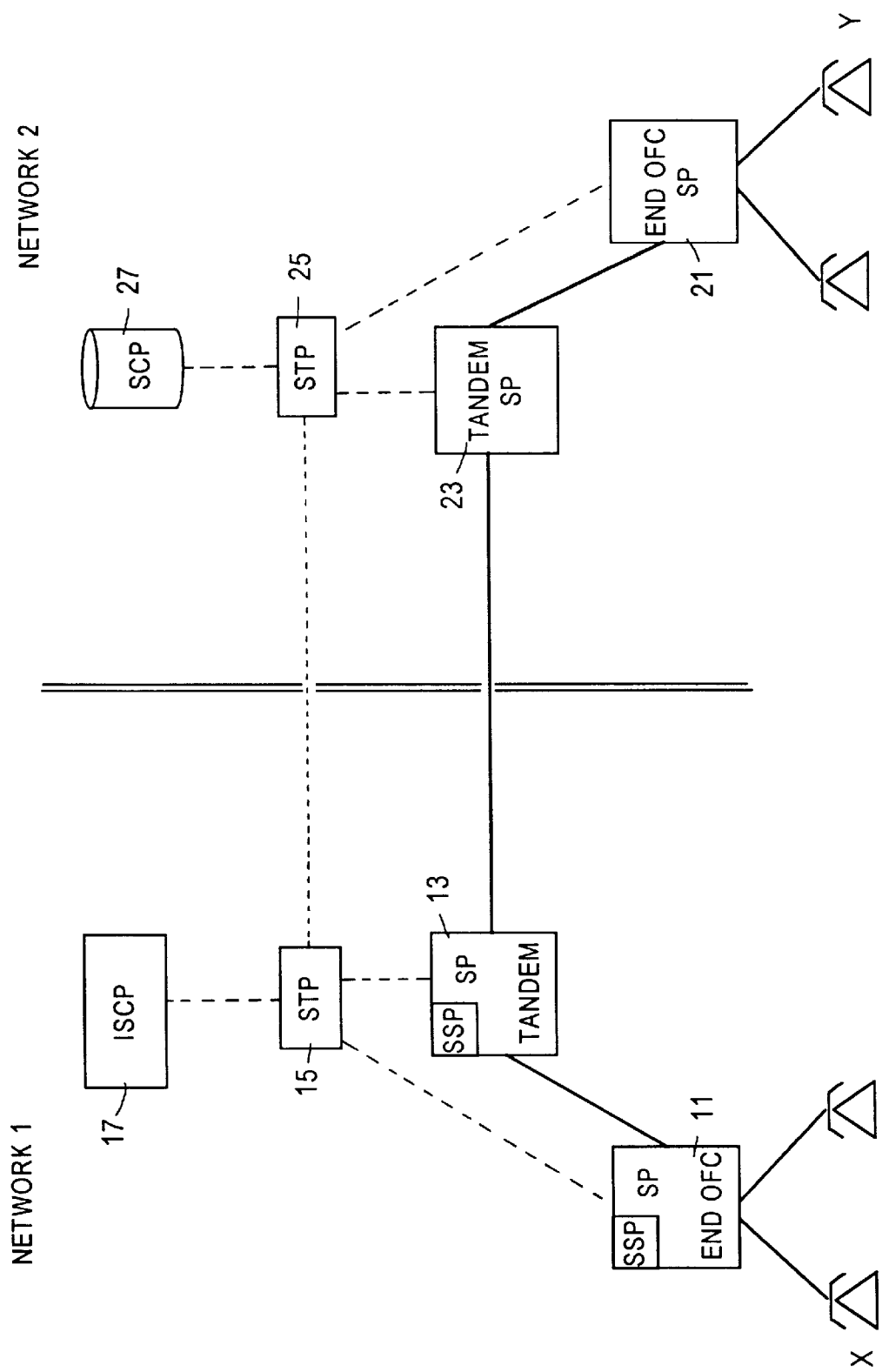
FIG. 3 is a simplified block diagram of a Public Switched Telephone Network and its SS7 signal control network.

Referring to FIG. 3 there is shown a simplified block diagram of a switched traffic network and the common channel signaling network used to control the signaling for the switched traffic network. In the illustrated example, the overall network actually comprises two separate networks 1 and 2. As shown, these networks serve different regions of the country and are operated by different local exchange carriers. Alternatively, one network may be a local exchange carrier network, and the other network may comprise an interexchange carrier network. Although the signaling message routing of the present invention will apply to other types of networks, in the illustrated example, both networks are telephone networks.

In FIG. 3, a first local exchange carrier network 1 includes a number of end office switching systems providing connections local communication lines coupled to end users telephone station sets. For convenience, only one end office 11 is shown. The first local exchange carrier network 1 also includes one or more tandem switching systems providing connections between offices. For convenience, only one tandem office 13 is shown. As such, the first telephone network consists of a series of switching offices interconnected by voice grade trunks, shown as solid lines. One or more trunks also connect the tandem 13 to one or more switches, typically another tandem office, in the second network 2.

Each switching office has SS7 signaling capability and is conventionally referred to as a signaling point (SP) in reference to the SS7 network. In the first network 1, each switching office 11, 13 also is programmed to recognize identified events or points in call (PICs). In response to a PIC, either office or switching system 11 or 13 triggers a query through the signaling network to an Integrated Service Control Point (ISCP) for instructions relating to AIN type services. Switching offices having AIN trigger and query capability are referred to as Service Switching Points (SSPs). The ISCP 17 is an integrated system as understood by those skilled in the art and as discussed in the above referenced Kay U.S. Pat. No. 5,247,571.

The end office and tandem switching systems typically consist of programmable digital switches with CCIS communications capabilities. One example of such a switch is a 5ESS type switch manufactured by AT&T; but other vendors, such as Northern Telecom and Siemens, manufacture comparable digital switches which could serve as the SPs.

Within the first network 1, the common channel interoffice signaling (CCIS) network includes one or more Signaling Transfer Points (STPs) and data links shown as dotted lines between the STP(s) and the switching offices. A data link also connects the STP 15 to the ISCP 17. One or more data links also connect the STP(s) in the network 1 to those in networks of other carriers, for example to the STP 25 in the network 2.

Although shown as telephones in FIG. 3, the terminal devices can comprise any communication device compatible with the local communication line. Where the line is a standard voice grade telephone line, for example, the terminals could include facsimile devices, modems, etc.

The network 2 is generally similar in structure to the network 1. The network 2 includes a number of end office SP type switching systems 21 (only one shown) as well as one or more tandem switching systems 23 (only one shown). The network 2 includes a CCIS network comprising one or more STPs 25 and data links to the respective SP type switching offices and to the CCIS system of other carriers networks.

In the illustrated example, the second network 2 is not a full AIN type network. The switching systems do not have full AIN trigger and query capabilities. The network 2 includes a Service Control Point (SCP) 27, but the routing tables utilized in that database are more limited than those in the ISCP 17. The switching systems 21, 23 can query the SCP 27 for routing information, but the range of trigger events are more limited, e.g., to 800 number call processing.

An end office switching system 11 or 21 shown in FIG. 3 normally responds to a service request on a local communication line connected thereto, for example an off-hook followed by dialed digit information, to selectively connect the requesting line to another selected local communication line. The connection can be made locally through only the connected end office switching system but typically will go through a number of switching systems. For example, when a subscriber at station X calls station Y, the connection is made through the end office switching system 11, the tandem offices 13 and 23 and the end office switching system 21 through the telephone trunks interconnecting the various switching offices.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in-band signaling, the trunks would be engaged before a determination is made that the called line is available or busy. Particularly if the called line is busy, this would unnecessarily tie up limited voice trunk circuit capacity. The CCIS system through the STPs was developed to alleviate this problem.

In the CCIS type call processing method, the originating end office switching system, switching system 11 in the present example, suspends the call and sends a message through the CCIS network (STPs 15 and 25) to the end office switching system serving the destination telephone line, i.e., to a terminating end office 21. The terminating end office determines whether or not the called station Y is busy. If the called station is busy, the terminating end office 21 so informs the originating end office 11 via CCIS message, and the originating end office provides a busy signal to the calling station. If the called station Y is not busy, the terminating end office 21 so informs the originating end central office 11. A telephone connection is then constructed via the trunks and end offices (and/or tandem offices) of the network between the calling and called stations.

For an AIN type service, such as call redirection based on data stored in the ISCP 17, the end offices and/or tandems are SSP capable and detect one of a number of call processing events, each identified as a 'point in call' (PIC), to trigger AIN type processing.

Specifically, in response to such a PIC, a tandem 13 or end office switching system 11 suspends call processing, compiles a call data message and forwards that message via common channel interoffice signaling (CCIS) links and one or more STPs 15 to an ISCP 17. If needed, the ISCP 17 can instruct the particular switching office to obtain and forward additional information. Once sufficient information has reached the ISCP 17, the ISCP 17 accesses its stored data tables to translate the received data into a call control message and returns the call control message to the switching office via the STP 15 and the appropriate CCIS links. The office uses the call control message to complete the particular call through the public switched network in the manner specified by the subscriber's data file in the ISCP 17.

The SCP 27 offers a similar capability in the network 2, but the range of service features offered by that database are more limited. Typically, the SCP 27 offers only 800 number calling services with a limited number of related call routing options. The triggering capability of the tandem 32 and end office 21 is limited to 800 number recognition. If the end office 21 is capable of 800 number recognition and CCIS communication with the SCP 27, as shown, then the office 21 launches a CCIS query to the SCP 27 in response to dialing of an 800 number at a station set Y. The SCP 27 translates the dialed 800 number into an actual destination number, for example the telephone number of station X, and transmits a CCIS response message back to end office 21. End office 21 then routes the call through the public network to the station X identified by the number sent back by the SCP 27, using CCIS call routing procedures of the type discussed above.

Figure 4:
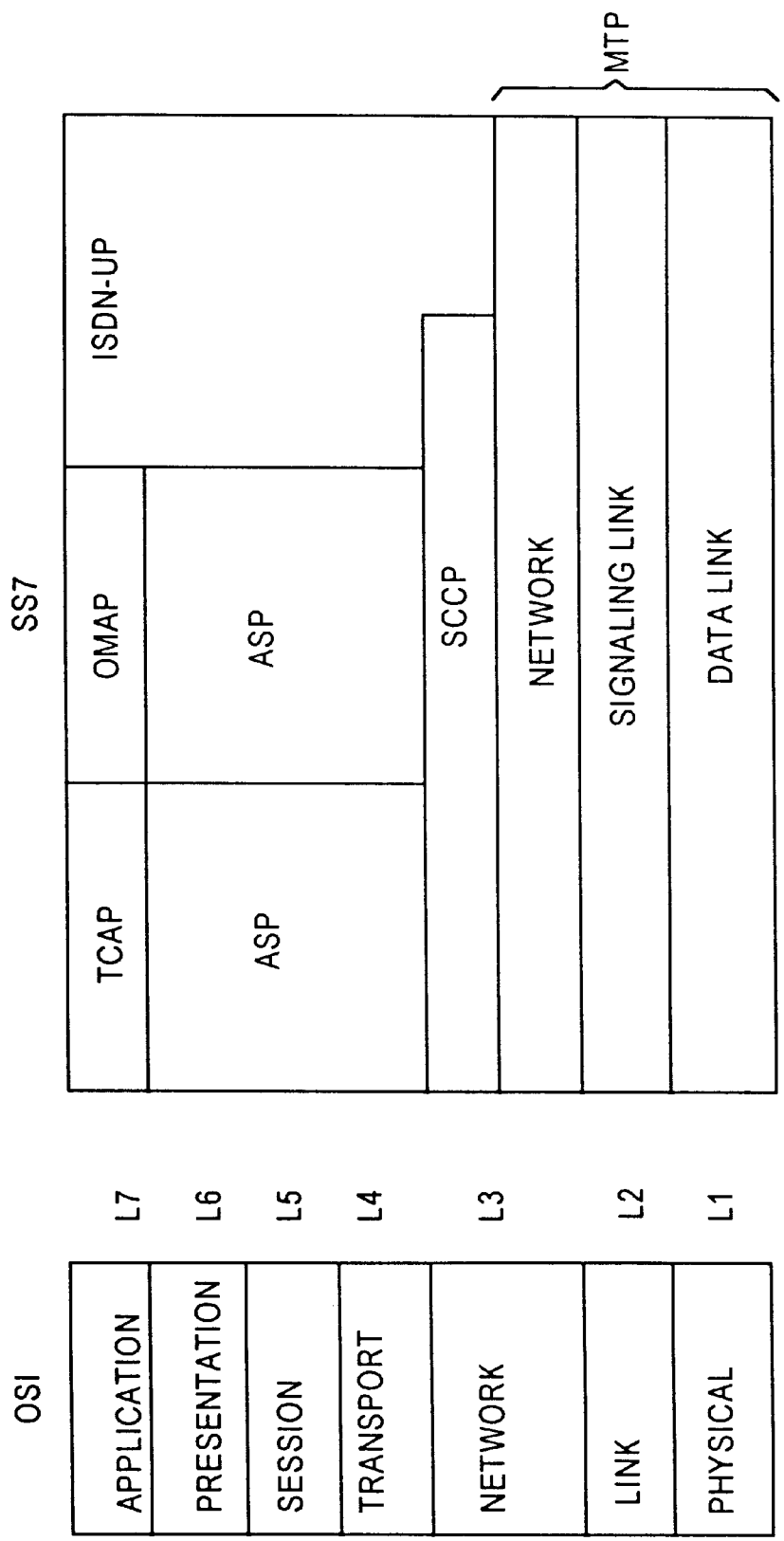
FIG. 4 depicts the protocol stack for SS7 and comparison thereof to the OSI model.

SS7 signaling protocol is based on the OSI model. The International Standards Organization (ISO) Open Systems Interconnection (OSI) reference model specifies a hierarchy of protocol layers and defines the function of each layer in the network. FIG. 4 shows the OSI model and the relationship thereof to the protocol stack for SS7. The lowest layer defined by the OSI model is the physical layer (L1). This layer provides transmission of raw data bits over the physical communication channel through the particular network. The layer next to the physical layer is the data link layer (L2). The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. The network layer provides capabilities required to control connections between end systems through the network, e.g., set-up and tear-down of connections.

In the OSI model, a transport layer protocol (L4) runs above the network layer. The transport layer provides control of data transfer between end systems. Above the transport layer, a session layer (L5) is responsible for establishing and managing communication between presentation entities. For example, the session layer determines which entity communicates at a given time and establishes any necessary synchronization between the entities.

Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. A summary description of the most relevant aspects of SS7 appears below.

For SS7, typical applications layer protocols include Transaction Capability Application Part (TCAP); Operations, Maintenance, Application Part (OMAP); and ISDN User Part (ISDN-UP). TCAP provides the signaling protocols for exchange of non-circuit related, transaction-based information, typically for accessing databases such as SCPs. For example, TCAP specifies the format and content of an initial query message from an SSP to an SCP and various response messages from the SCP back to the SSP. ISDN-UP is the actual call control application protocol of SS7. ISDN-UP specifies the procedures for setting up and tearing down trunk connections utilizing CCIS signaling. ISDN-UP messages, for example, include an Initial Address Message (IAM), an Address Complete Message (ACM) and an Answer Message (ANM).

SS7 specifies an Application Service Part (ASP) for performing the functions of the presentation, session and transport layers for the TCAP and OMAP protocols. The lower four layers of the SS7 protocol correspond to the lower three layers (network, link and physical) of the OSI model. The lower three layers of the SS7 protocol, the network layer, the signaling link layer and the data link layer, form the Message Transfer Part (MTP) of SS7. The MTP is common to messages for all applications and provides reliable transfer of signaling messages between network nodes. The MTP relays messages between applications running at different nodes of the network, effectively like a datagram type service.

The SS7 network layer (lower portion of L3) routes messages from source to destination. Routing tables for the signaling network layer facilitate routing based on logical addresses. The routing functionality at this layer is independent of the characteristics of particular links.

The signaling link layer (L2) performs flow control, error correction and packet sequence control. The signaling data link layer (L1) is the actual physical connection between nodes of the CCIS network. The signaling data link layer in CCIS provides full duplex packet switched data communications. The signaling data link layer element provides a bearer for the actual signaling message transmissions. In a digital environment, 56 or 64 Kbits/s digital paths carry the signaling messages between nodes, although higher speeds may be used.

At the equivalent of the OSI network layer (L3), the SS7 protocol stack includes a Signaling Connection Control Part (SCCP) as well as the network layer portion of the MTP. SCCP provides communication between signaling nodes by adding circuit and routing information to SS7 messages. The SCCP routing information serves to route messages to and from specific applications. Each node of the signaling network, including the various switching offices and databases in each network, is assigned a 9-digit point-code for purposes of addressing signaling messages through the CCIS network. Both the SCCP protocol and the MTP processing utilize these point codes.

Figures 5, 6:
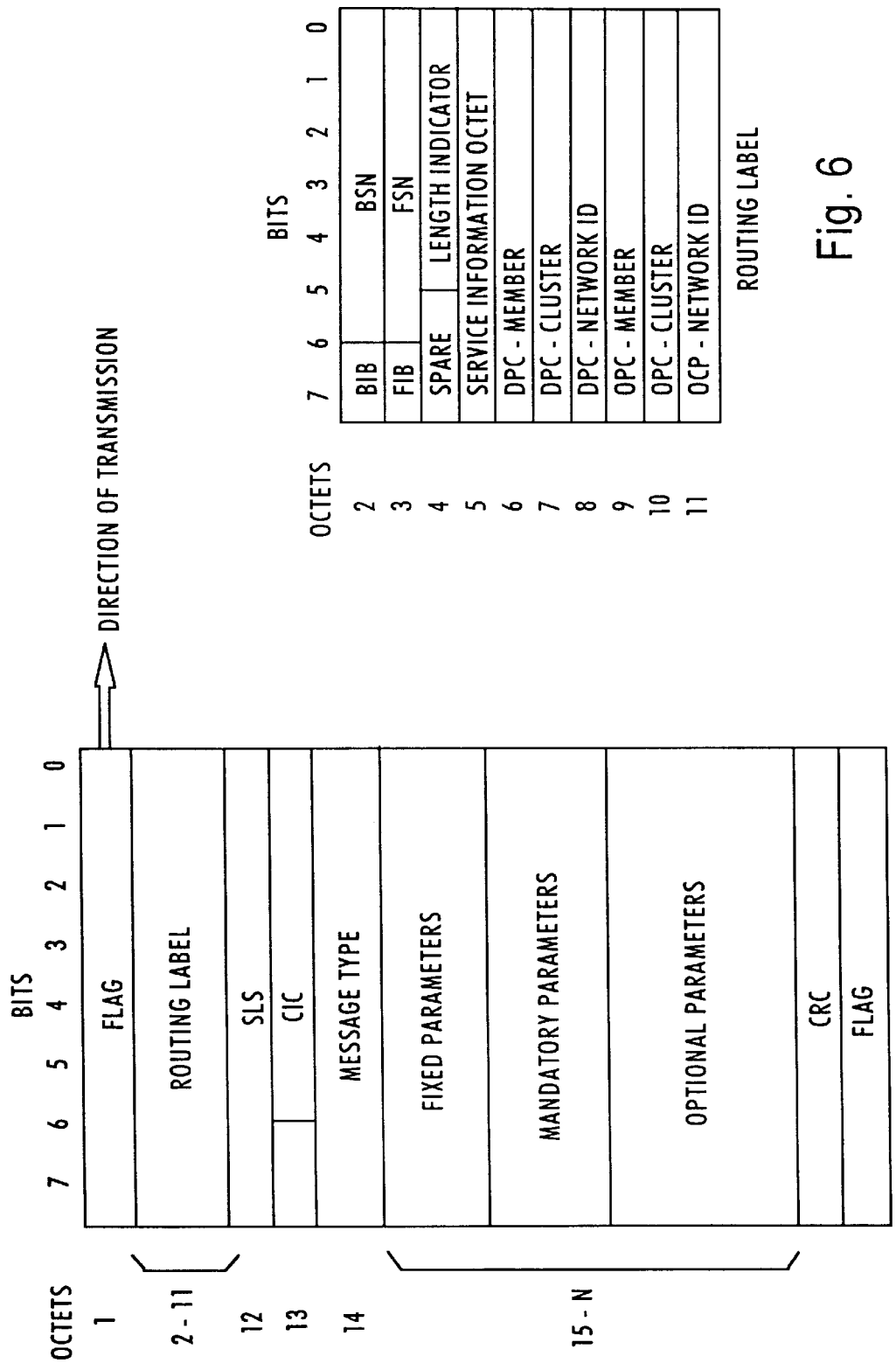
FIG. 5 illustrates in graphic form the layout of an SS7 protocol message packet.
FIG. 6 illustrates in graphic form the layout of the routing label portion of the SS7 protocol message packet shown in FIG. 5.

The SS7 messages traverse the network at all times. The messages themselves comprise digital serial messages that come into the STP. FIG. 5 provides a graphic illustration of an SS7 message packet. The first byte or octet of the message is a flag, which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bit bytes or octets. These octets represent the information carried by the message. The message contains both fixed and variable parameters. The Message Transport Part (MTP) of the SS7 message is always in the same place. The values change but the MTP is always in the same place.

Octets 2–11 form a routing label as discussed later with regard to FIG. 4. Octet 12 contains a signaling link selection (SLS) byte used to select specific links and/or determine the extent to which the network can select specific links to achieve load sharing. Octet 13 contains a Customer Identification Code (CIC) which typically is used to select an interexchange carrier. Octet 14 contains a message type indicator, and octets 15–N contain the actual message, in the form of fixed parameters, mandatory parameters and optional parameters. The length of the mandatory parameters field and the optional parameters field are variable.

There would be 16 other bits that have Cyclic Redundancy Codes (CRCs) in them and another flag which would constitute the end of the SS7 message (and typically the start of the next message). CRCs constitute a further error detection code which is a level 1 function in the protocol.

FIG. 6 is a graphic illustration of the routing label of the SS7 message packet. The first 7 bits of octet 2 constitute the Backward Sequence Number (BSN). The eighth bit is the Backward Indicator Bit (BIB) which is used to track whether messages have been received correctly. The length of an SS7 message is variable, therefore octet 4 contains a message length indicator.

Octet 5 is the Service Information Octet (SIO). This indicates whether it is a Fill In Signal Unit (FISU), Link Service Signaling Unit (LSSU) or Message Signaling Unit (MSU). MSUs are the only ones used for setting up calls, LSSUs are used for alignment, and FISUs are fill in signals. The MSU indicator type SIO octet is formatted and encoded to serve as an address indicator, as discussed below.

The routing label includes fields for both destination related addressing and point of origin addressing. The destination or 'called party' address includes octets 6, 7 and 8. Octets 9–11 carry origination point code information, for example member, cluster and network ID information.

In the example shown in FIG. 6, the three octets of the called party address contain an actual destination point code (DPC) identified as DPC-member, DPC-cluster and DPC-network ID information. In operation, the translation tables stored in the STP cause the STP to actually route based on the DPC without translating any of the DPC octets into new values. The called party address octets (6–8), however, may carry other types of called party addressing information and receive different treatment by the STP. For example, these octets may carry a global title (GTT) and subsystem number (SSN) information.

To distinguish the types of information carried in octets 6–8, the MSU type service information octet (5) contains an address indicator. For example, a '1' value in the first bit position in this octet signifies that the called party address octets contain a subsystem number, a '1' value in the second bit position in this octet signifies that the called party address octets contain a signaling point code. The third, fourth, fifth and sixth bits of the address indicator serve as the global title indicator and are encoded to identify the presence and type of global title value in octets 6–8.

Figure 7A:
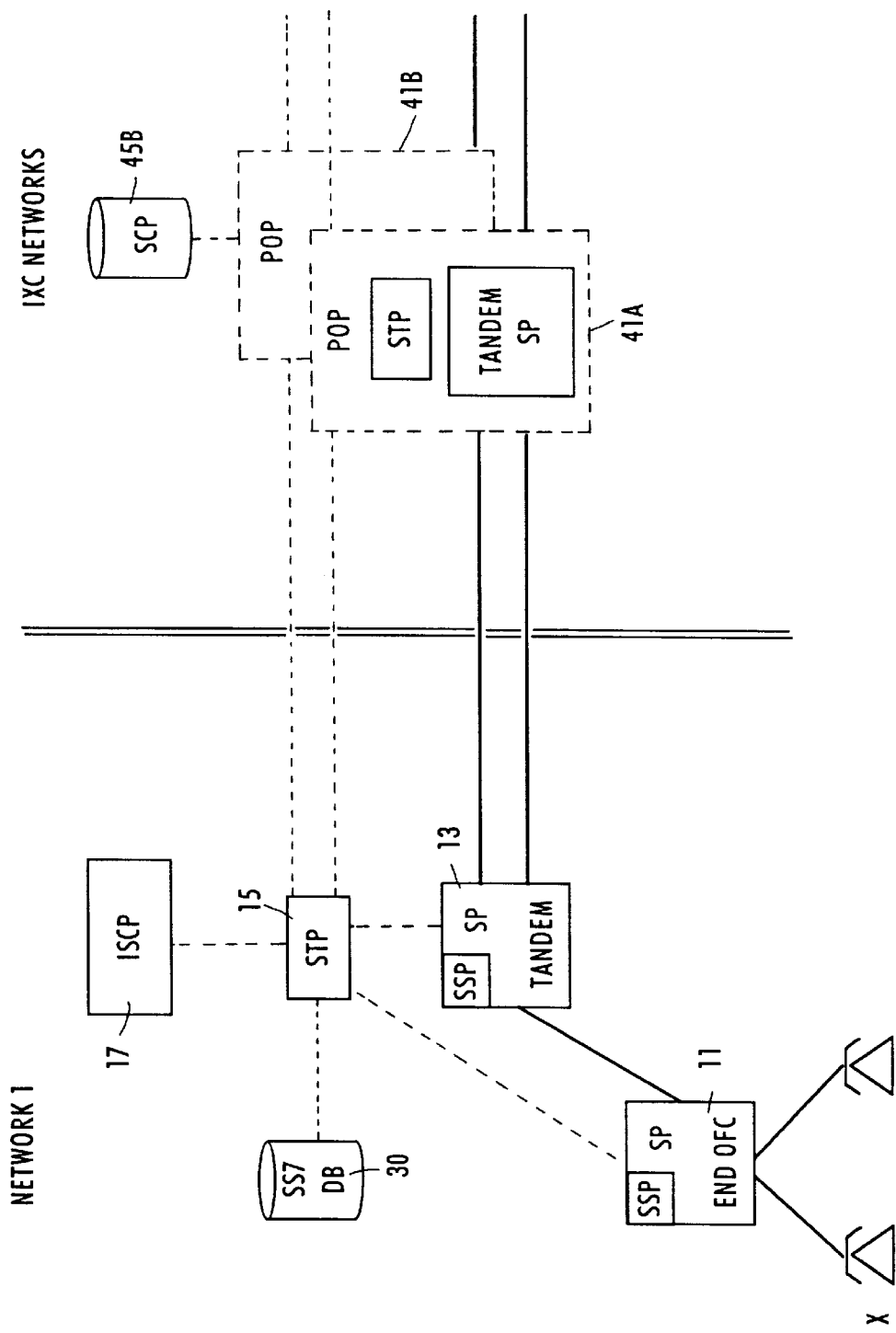
FIGS. 7A and 7B together show a somewhat more detailed block diagram of a network of the type shown in FIG. 3 including two interexchange carrier networks linking local exchange carriers (LECs).
Figure 7B:
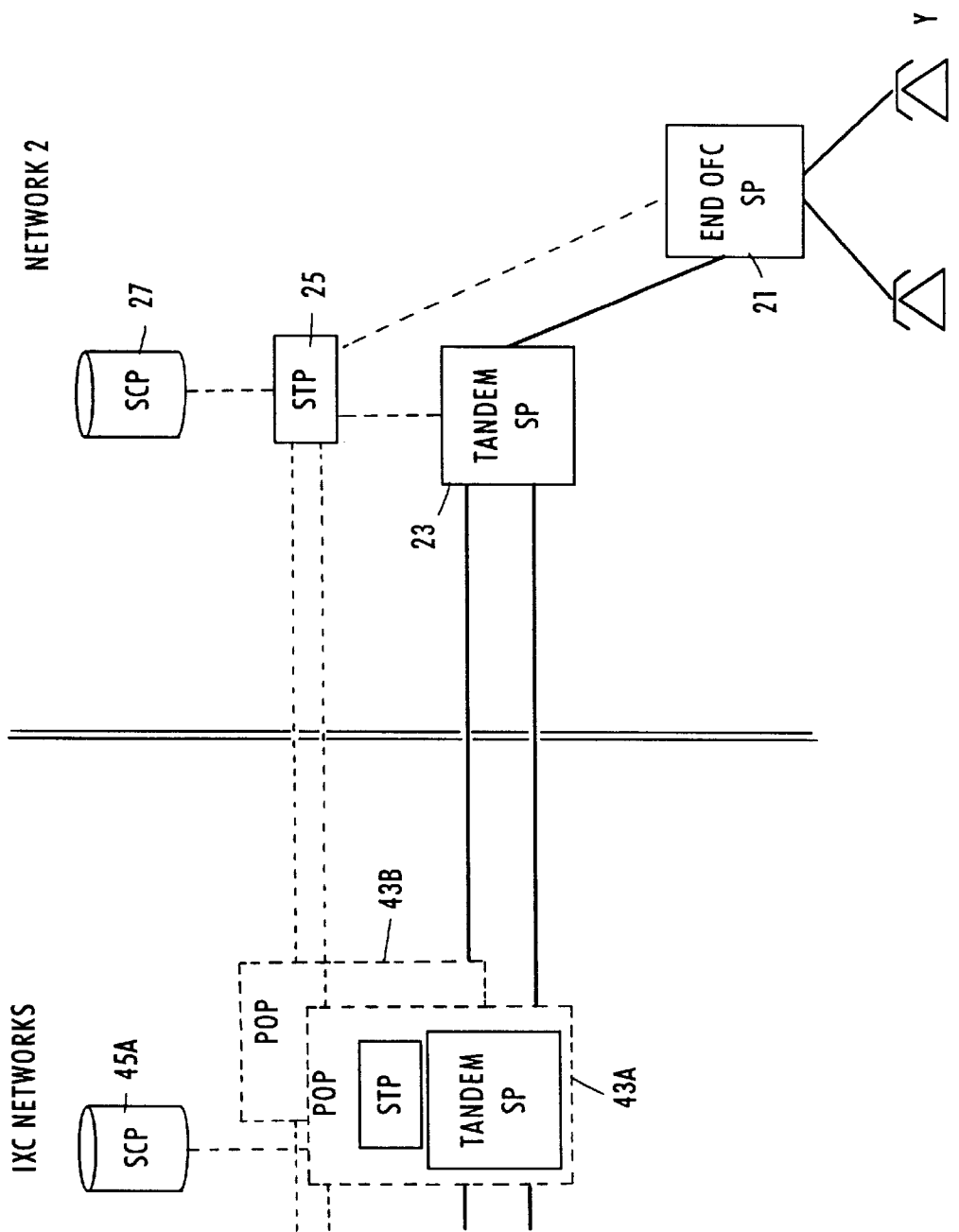

FIGS. 7A and 7B together show a public switched telephone network similar to that of FIG. 3. Again, the network actually includes two local exchange carrier networks, 1 and 2, and the structure and general methods of operation of those networks are identical to those of the networks 1 and 2 shown in FIG. 3. FIGS. 7A and 7B, however, add a high level functional representation of two competing interexchange carrier networks.

Each local exchange carrier network operates within boundaries of a defined Local Access and Transport Area (LATA). Current laws require that interexchange carriers, not local exchange carriers, must transport calls crossing the LATA boundaries, i.e., all interLATA calls. To transport calls from one LATA to another, each interexchange carrier network includes a point of presence (POP) 41A, 41B in the region of the first local exchange carrier network 1 and a point of presence (POP) 43A, 43B in the region of the second local exchange carrier network 2. Although not shown in detail, the interexchange carrier will operate a network of communication links and switching offices to provide transport between the POPs in different LATAs.

The interexchange carrier networks provide two-way transport for both communication traffic (e.g., voice calls) and signaling. For CCIS type processing, the POP in each region will include both a tandem type switch with at least SS7 signaling point (SP) capability as well as an STP. In each POP, the tandem connects to a switching office in the respective local exchange carrier network, and the STP connects to an STP of the respective local exchange carrier network. In the illustrated simplified example, the tandem switches in POPs 41A, 41B connect to the tandem 13 in network 1. The STPs in POPs 41A, 41B connect to the STP 15 in network 1. Similarly, the tandem switches in POPs 43A, 43B connect to the tandem 23 in network 2, and the STPs in those POPs connect to the STP 25 in network 2.

Typically, each interexchange carrier will operate an SCP database 45A, 45. The SCP 45A, 45B connects to a signal transfer point (STP) at some point in each respective interexchange carrier's network. In the illustrated example, the SCP 45B connects to an STP in POP 41B, and the SCP 45A connects to the STP in POP 43A. The SCPs provide data translations for 800 number calling services and the like offered by the interexchange carriers. If an interexchange carrier chooses, one or more of the carrier's tandems may have full SSP capability, and the SCP could be replaced by an ISCP to offer AIN type services to the interexchange carrier's customers. The precise arrangement of switches, trunks, STPs, signaling links and SCPs or the like vary between interexchange carriers depending on the traffic load each transports, the sophistication of services provided, etc.

Figure 8:
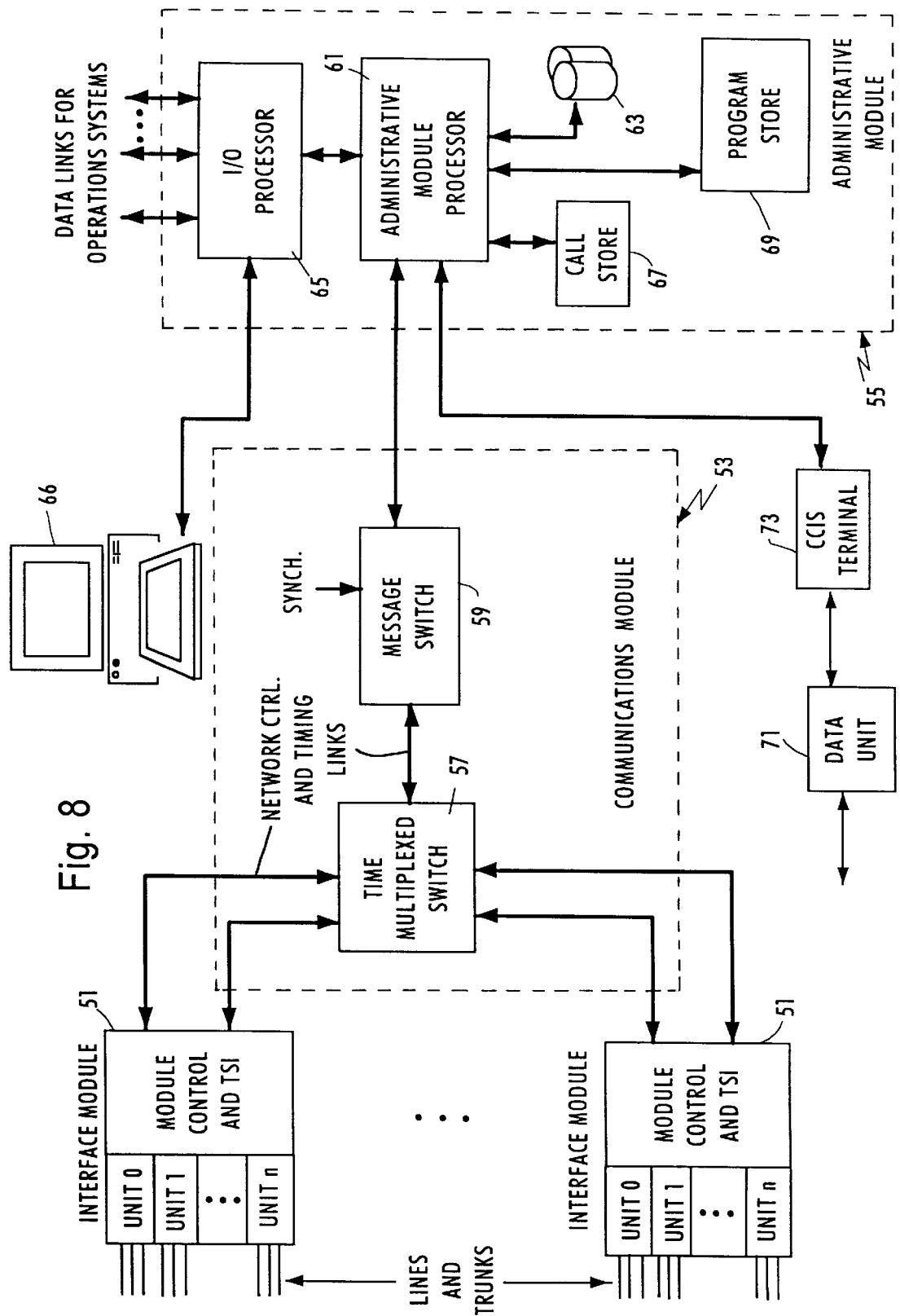
FIG. 8 is a more detailed diagram of a typical switching system utilized in networks of the type shown in FIGS. 3 and 7A and B.

FIG. 8 is a simplified block diagram of an electronic program controlled switch which may be used as any one of the SP or SSP type switching offices in the systems of FIG. 3 or FIGS. 7A–7B. As illustrated, the switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. The interface modules for the analog lines also include dial pulse detectors and dual tone multifrequency (DTMF) detectors. Alternatively, the lines or trunks may use digital protocols such as T1 or ISDN. Each interface module 51 also includes a digital service unit (not shown) which is used to generate call progress tones.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disc storage 63, for overall control of operations of the switching office. The administrative module processor 61 communicates with the interface modules 51 through the communication module 55. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signaling link between the administrative module processor 61 and an STP of the SS7 signaling network, for facilitating call processing signal communications with other central offices (COs) and with one or more of the SCPs and/or the ISCP 17.

As illustrated in FIG. 8, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. The program store 69 stores program instructions which direct operations of the computer serving as the administrative module processor.

Of particular note, the translation data in the disc storage 63 includes translation information needed to address messages for transmission through the signaling network. In particular, when the switch needs to send a message through the SS7 network to a particular node, the data from the disc storage 63 provides the global title and/or point code for the message destination.

Figure 9:
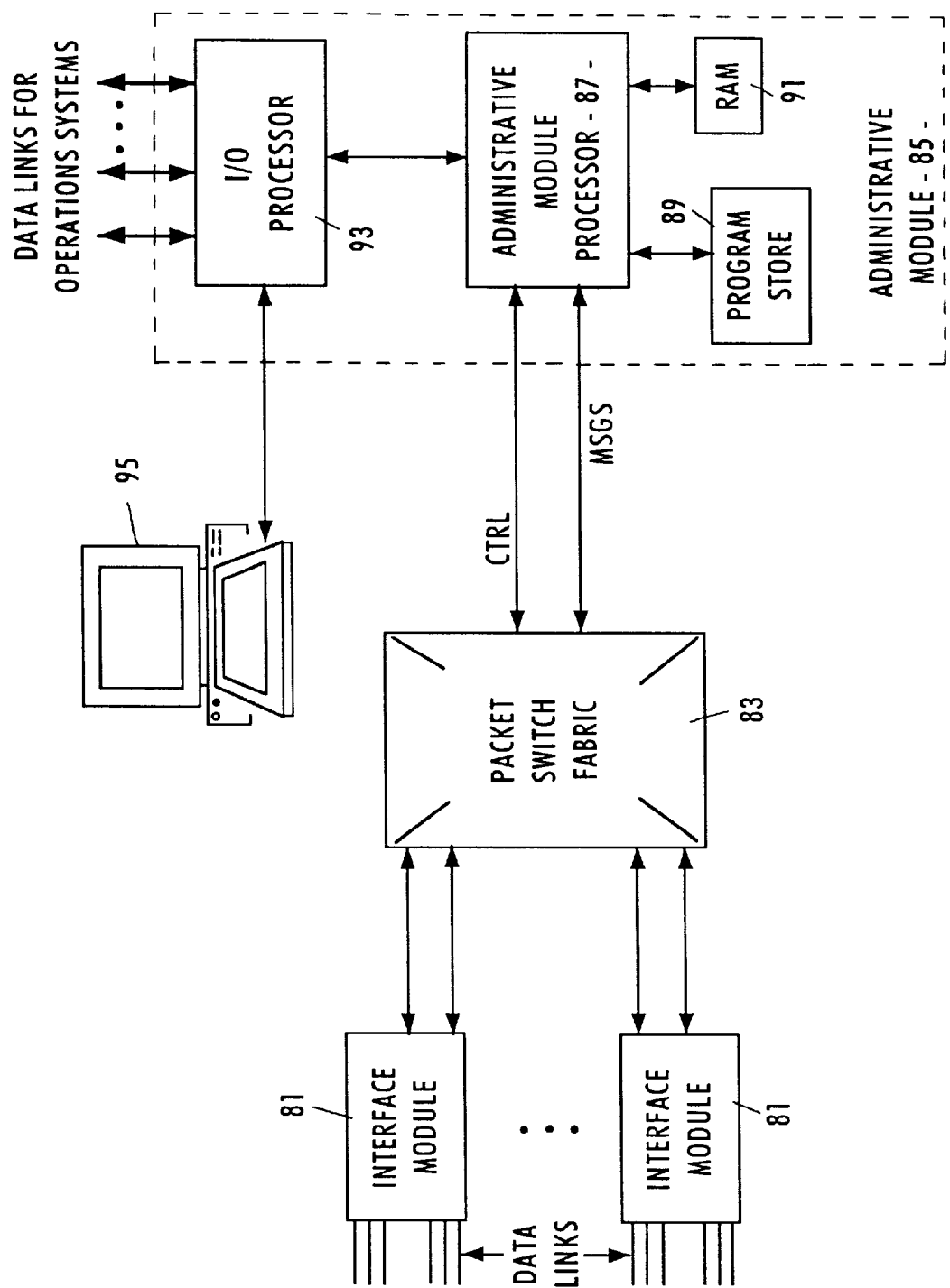
FIG. 9 is a more detailed diagram of a typical signal transfer point utilized in networks of the type shown in FIGS. 3 and 7A and B.

FIG. 9 depicts the functional elements of one of the STPs shown in the networks of FIGS. 3, 7A and 7B. As shown, the STP comprises interface modules 81, a packet switch fabric 83 and an administrative module 85. The interface modules 81 provide the physical connections to the two-way data links to the switching systems, SCPs, ISCPs and other STPs. Typically, these links provide two-way 56 kbits/s or 64 kbits/s virtual circuits between nodes of the CCIS signaling network. The modules provide a two-way coupling of SS7 data packets, of the type shown in FIG. 3, between the actual data links and the packet switch fabric. The packet switch fabric provides the actual routing of packets coming in from one link, through one of the interface modules 83 back out through one of the interface modules 81 to another data link. The packet switch fabric 83 also switches some incoming messages through to the administrative module 85 and switches some messages from the administrative module 85 out through one of the interface modules 81 to one of the data links.

The administrative module 65 includes an administrative module processor 87, which is a computer equipped with RAM 91 and a program store 89, for overall control of operations of the switching office. Although shown as a logically separate element, the program store 89 typically is implemented as memory within the computer serving as the administrative module processor 87. The administrative module processor 89 provides control instructions to and receives status information from the operation control element (not shown) within the packet switch fabric 83. The administrative module processor 87 also transmits and receives some messages via the packet switch fabric 83 and the interface modules 81. The administrative module 55 also includes one or more input/output (I/O) processors 65 providing interfaces to terminal devices for technicians such as shown at 66 in the drawing and data links to operations systems for traffic recording, maintenance data, etc.

The program store 69 stores program instructions which direct operations of the computer serving as the administrative module processor 87. The RAM 91 stores the translation tables used to control routing and/or processing of messages through the STP. The RAM may be implemented as a disc storage unit, but preferably the RAM comprises a large quantity of semiconductor random access memory circuits providing extremely fast access to information stored therein.

Figure 10:
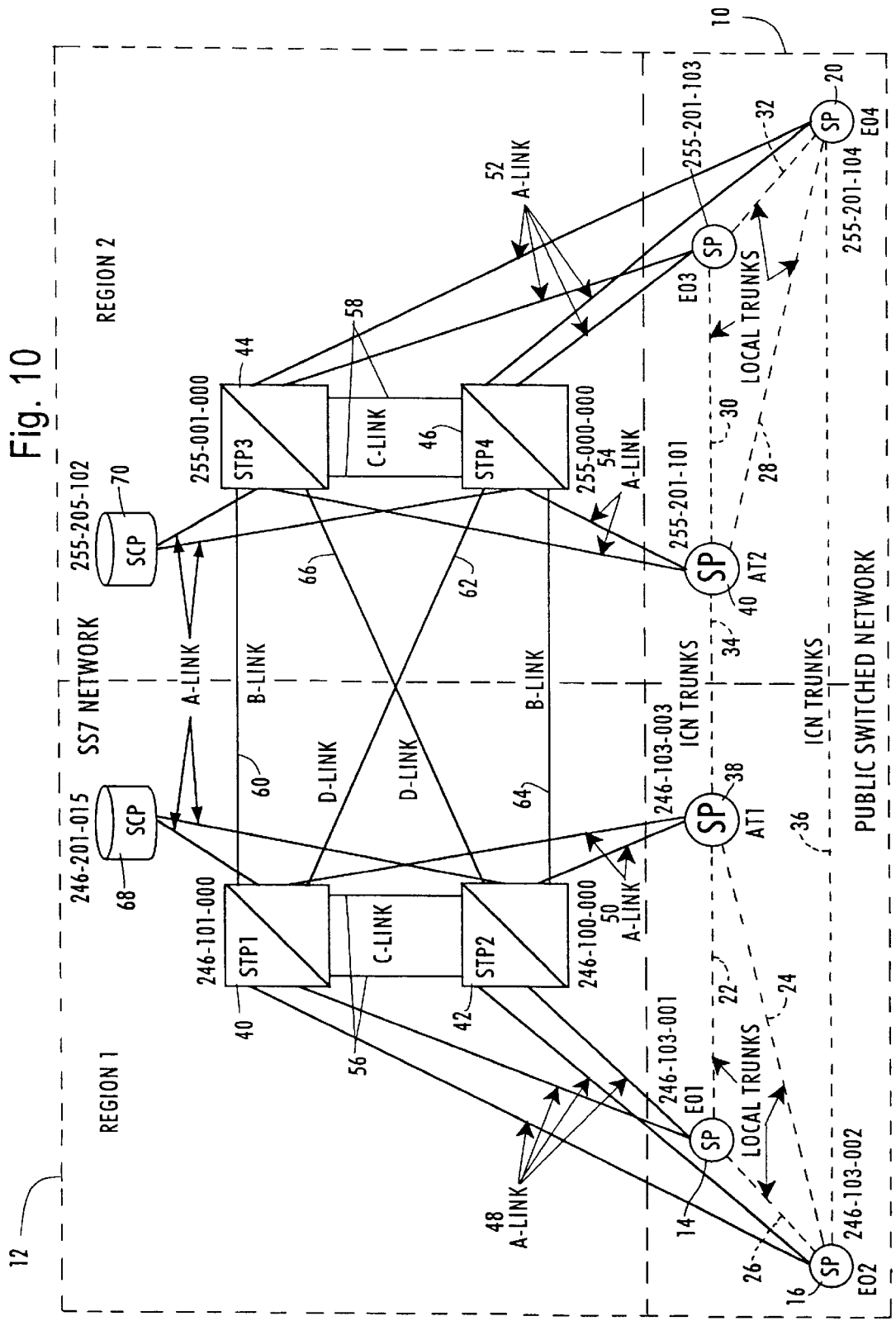
FIG. 10 provides a more detailed illustration of two telephone networks linked by an SS7 network showing point codes.

FIG. 10 provides a more detailed illustration of two telephone networks linked by an SS7 network along with legends facilitating a detailed description of its operation. The overall switched telephone network is generally indicated at 100 having a common channel signaling network in the form of an SS7 network illustrated generally at 112. The switched telephone network consists of a series of central offices which are conventionally referred to as signaling points (SPs) in reference to the SS7 network. Certain of these SPs comprise end offices (EOs) illustrated at 114, 116, 118 and 120 as EOs 1–4 in FIG. 10. Each signaling point has a point code comprising a 9-digit code assigned to every node in the network. In FIG. 10 EO1 has a point code of 246-103-001, EO2 has a point code of 246-103-002, EO3 has a point code of 255-201-103, and EO4 has a point code of 255-201-104.

The end offices EO1 and EO2 represent end offices in the region of one regional operating company while end offices EO3 and EO4 represent end offices of the region of a different operating company. Each operating company has its own network ID, shown here as 246 for the left region and 255 for the right region in FIG. 10. The number 103 in the designation 246-103-001, is the number of the cluster. A cluster can hold 32 SPs or members, the member being designated by the final 3 numbers. Thus 246 may represent C & P of Virginia Regional Operating Company, cluster 103, member EO2 for EO2 when viewed from an SS7 standpoint.

The broken lines connecting the SPs together may be analog trunks or voice or similar circuits. The SPs in a given region are connected together by local trunks 122, 124 and 126 in the left region and 128, 130 and 132 in the right region. The SPs in one region are connected to the SPs in other regions via inter-exchange carrier network trunks or ICN trunks 134 and 136 in FIG. 10 connected to Access Tandems (ATs) 138 and 140 (AT1 and AT2). These SPs or ATs are shown as having point codes 246-103-003 and 255-201-101 respectively.

Referring to FIG. 10, the SS7 network 112 comprises a series of Signal Transfer Points (STPs) shown here at 140, 142, 144 and 146 designated STP1, STP2, STP3 and STP4. Each STP in a network is connected to the SPs in the network by A links indicated at 148, 150, 152 and 154. STP1 and STP2 constitute a mated pair of STPs connected by C links 156 while STP3 and STP4 constitute a mated pair connected by C links 158, each mated pair serving its respective transport area. It will be understood that there may be multiple mated pairs per region, one for each designated transport area. STP1 is connected to STP3 by B link 160 and to STP4 by D link 162. STP2 is connected to STP4 by B link 164 and to STP3 by D link 166.

As will be understood, the A, B, C and D links are physically identical with the designation relating to cost in terms of ease of access. The A links represent the lowest cost. B and D links have the same route cost with respect to SS7 so that the D designation is used only because it extends diagonally in the drawing. The C links are used to communicate between the two paired STPs for network management information and also constitute another route. The STPs in mated pairs have the same translations. Thus the translations in STP1 are the same as the translations in STP2, and the translations in STP3 are the same as the translations in STP4. The C links communicate between the paired STPs for network management information and SS7 message routing. The STP pair cannot function without the C links. Therefore, unnecessary utilization of the C links causes congestion and prevents the paired STPs from performing their intended function.

The STPs are connected to Signal Control Points (SCPs) indicated in FIG. 10 as an SCP 168 and an ISCP 170. The ISCP is an Integrated Signaling Control Point, which is basically the same as an SCP but comprises a larger and more powerful computer. SCPs are usually used for 800 and credit card services with ISCPs being used for AIN. However, this is optional. The ISCP may hold application information as well as routing information whereas an SCP contains routing information, i.e., routing tables.

The SS7 network constitutes a highly redundant data network, generally a 56K switched data circuit. By way of example, an SS7 message from EO2 to EO4 might travel any one of 8 possible routes. It could go from EO2 to STP1, from STP1 to STP3, STP3 to EO4. One variation on that route would be from STP1 down the D link 162 to STP4 to EO4, and so forth. In the event that a link between STP3 and EO4 was lost, an SS7 route could be established from EO2 to EO4 via STP1 to STP3 and then via C link 158 to STP4 to EO4. However, that would be an undesirable route in unnecessarily using the C link. A links provide direct connectivity while C links provide circuitous routes using extra switches, a situation to be avoided. An alternate route would be from STP1 via D link 162 to STP4 to EO4. Another reason for not using the C link is to avoid tying up the entire STP3-STP4 pair.

The operation of placing a call from EO2 to EO4 may be described as follows: The user at EO2 picks up his phone and dials the number that resides in EO4. The SP generates an Initial Address Message (IAM). This message would have the destination point code of EO4, namely, point code 255-201-104. It would have an originating point code of EO2, namely, 246-103-002, in addition to miscellaneous other information needed for call set-up. That message would then be sent to either STP1 or STP2. Assuming that the message goes to STP1, STP1 would look at the message and determine that the message was not for it as an STP but rather is for EO4. STP1 would then investigate possible routings to get to 255 or EO4. B and D links are available and STP1 would choose one of the two. Assuming that it chooses the B link to STP3, STP3 repeats the same procedure. It determines that the message is for 255 or EO4 and puts that message on the A link to EO4.

EO4 gets the IAM which has the called telephone number in it and determines whether or not the line is busy. If the line is not busy, EO4 generates an Address Complete Message (ACM) to indicate that it received the request for a call and that the number is not busy. That message is sent back by simply reversing the point codes. Now the destination point code is EO2 and the originating point code is EO4. The message goes back to EO2 to indicate that the IAM was received and processed. As soon as the phone is answered at EO4, EO4 sends an Answer Message (ANS) back to EO2 indicating that the phone at EO4 was picked up, and at that time the trunks are connected together. EO2 connects its user to that trunk and EO4 connects its user to that trunk so that communication is established. All such messaging may occur in about 600 milliseconds which would be average but not necessarily fast.

The foregoing constitutes the function of the STPs insofar as routing is concerned. The STPs look at a point code and if it is not for them they just pass it on via a route determined from translations and routing tables. The C link is the last route permitted and is not utilized unless no other route is available.

Figure 1:
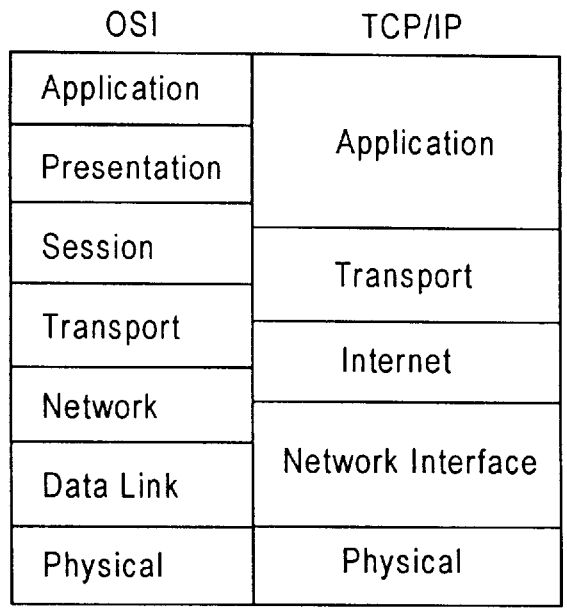
FIG. 1 is a comparative diagram of the International Standards Organization (ISO) Open System Interconnection (OSI) model for network architectures and a commonly used TCP/IP model.
Figure 2:
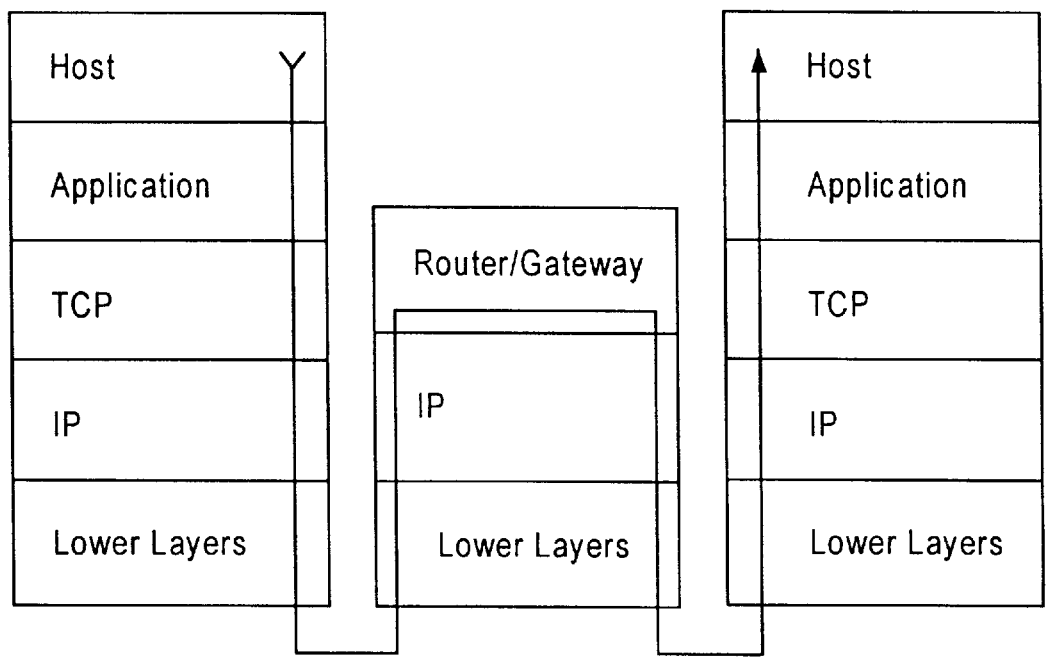
FIG. 2 is a simplified block diagram illustrating the passage of a packet from an initiating host to a receiving host through a gateway using the TCP/IP model.

As opposed to the foregoing, where the point code was for EO4 and not STP1, the point code may be for STP1. One example of such a situation would be the case of an 800 call. The 800 number is a fictitious number which is associated with a POTS number in a database in the SCP. Thus if EO2 makes an 800 call to EO4 it is necessary to determine the real telephone number. EO2 launches a Switching Connection Control Part (SCCP) message, which is a database request. This point code has a destination point code of an alias which is the point code of STP1 and STP2. STP1 and STP2 have various point codes indicated in FIG. 1 as 246-100-000 and 246-101-000. They also have alias point codes that indicate that they have a function to perform. Upon recognizing such a point code the STP does a data search and generates another SCP message to perform a database search or dip. This returns the real telephone number and the STP now has the destination point code of the real telephone number message. This is sent back to EO2. STP1 determines that this message is not for me but for EO2. The message is sent back down to EO2. EO2 now has a real telephone number and the system performs the IAM and ACM procedure all over again to set up the call. The only difference between a regular direct call and an 800 call is the necessity to perform the dip to obtain the real number first. This procedure takes about 1.3 seconds because of the additional operation. The STPs have various databases, such as the 800 database and the credit card database, and there is still a further database for AIN.

The SS7 protocol describes how the signal messages are built and routed and provides for network management of the SS7 network itself. Thus if a link between EO4 and STP3 were to be lost, STP3 generates a transfer restricted message (TFR) to all nodes, i.e., all SPs connected to STP3, indicating that traffic is not to be sent to STP3 for EO4 because no route from STP3 to EO4 exists. If both A links to EO4 were down, EO4 would essentially be isolated and the STP pair STP3 STP4 would broadcast a transfer prohibited (TFP) message indicating that nothing should be sent to the pair for EO4.

In the transfer restricted situation it would be possible for STP3 to reach EO4 via the C link to STP4. This is a non-favored route but would be used in necessity. Handling such situations is the purpose of network managing messages. Congestion control or TFC accomplishes basically the same thing except that it constitutes a more sophisticated message limiting use of a circuit by stopping messages below a certain priority. Each message has a different priority. IAMs have a priority of 1 where ANS messages have a priority of 2.

Upon congestion occurring in the STP node for EO4 a new call could not be sent to EO4 because it constitutes a priority 1 message which is restricted because the congestion level is 2. Only priority 2 messages and higher would be permitted. If a call is already existing it could be answered or released. Releases have a priority of 2 to permit call completion. New calls could not be initiated until the congestion had been removed or lowered to congestion status 1 or 0.

Figure 11:
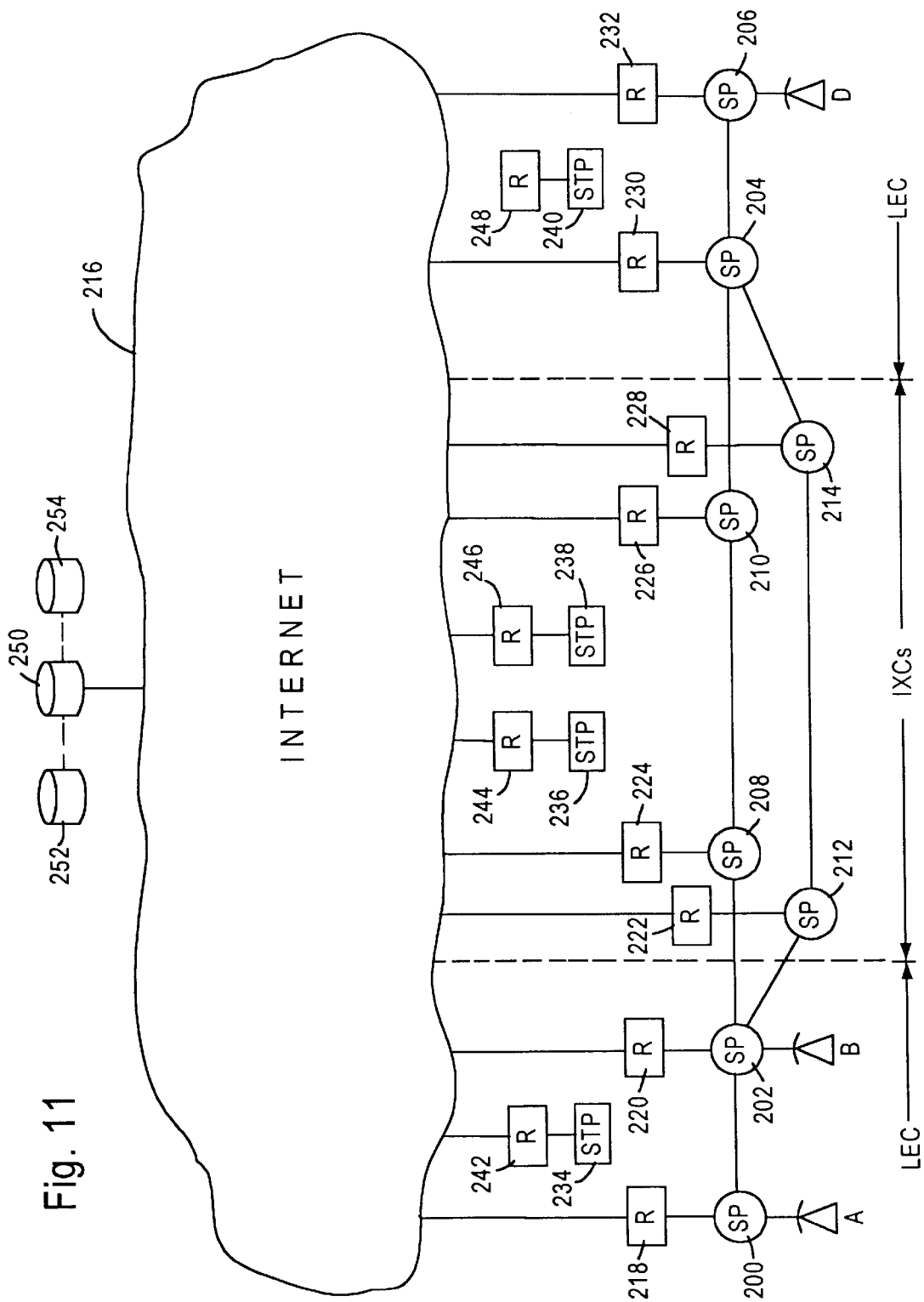
FIG. 11 shows a block diagram of the architecture of a hybrid network system according to the invention.

Referring to FIG. 11 there is shown a simplified block diagram of a communications system according to a preferred embodiment of the invention. The system illustrated in diagrammatic form in FIG. 11 includes two local exchange carriers or LECs linked by an interexchange carrier or IXC. These carriers are generally similar to the corresponding carriers shown in the conventional system illustrated in FIGS. 7A and B. The LECs are generally similar to the regional carriers illustrated with more detail in FIG. 10.

The leftmost LEC is shown as including signaling points SP 200 and SP 202, which are shown connected by a heavy line representing trunk connection. This may be either direct connection as shown or may be through one or more tandems. The rightmost LEC is shown as including signaling points SP 204 and SP 206, which also are shown connected by a heavy line representing trunk connection. This also may be either direct connection as shown or may be through one or more tandems. In this description all SPs are assumed to have SSP capability. The intermediate IXCs are shown as respectively including signaling points SP 208 and SP 210, and SP 212 and SP 214, which also are shown connected by heavy lines representing trunk connections. These also may be direct or through one or more tandems. For convenience of description the signaling points SPs 200, 202, 204 and 206 may regarded as end office (EO) switching systems having subscriber stations A, B, C, and D connected thereto by local links.

Centrally located in FIG. 11 is a cloud which represents the Internet 216. Each SP or SSP is connected through a router to the Internet. These routers are shown at 218–232 and are of the type commonly used as interfaces to the Internet. Signal transfer points or STPs corresponding to those shown in FIGS. 7A and 7B are also connected to the Internet through routers. The STPs are shown at 218–240. The routers are shown at 242–248. It will be understood that the STPs 218–240 represent paired STPs connected by C links as shown in FIG. 10. It will also be understood that the router connections to the STPs shown by single lines represent individual connections to the STPs in the pair. Also, the single lines connecting the routers 218–232 to the Internet will be understood to represent the multiple A links shown in FIG. 10 connecting the SPs to the STPs. The routers are provided with sufficient ports to enable the necessary connections. While the drawings depict only a limited number of SPs and STPs it should be appreciated that this is illustrative only. It is a feature of the invention that an almost unlimited number of SPs and STPs may be accommodated limited only by the capacity of the world-wide Internet.

It is an important advantage of the invention that the architecture is so designed as to be almost universally adapted to interconnect widely spaced telecommunications systems using differing signaling control systems. The central control for this very wide area system is provided by a central controller 250 which is also connected to the Internet. The central controller may be viewed as being akin to a universal ISCP which provides not only control of the linked telecommunications networks but also of the necessary routing within the Internet to control the various linked network signaling control systems. As will be appreciated, such a central controller requires a large database and controller capacity. This is implemented according to the invention by providing the controller with a hierarchical architecture of the type used with domain name servers in the Internet. Connected supplemental capacity of this type is represented in FIG. 11 by the exemplary supporting and subsidiary controller databases 252 and 254.

The operation of the communications system of FIG. 11 is now described in the handling of a typical call which involves the central control point. For convenience there is described a call for a telephone station whose number has been forwarded using a custom calling service commonly known as call forwarding. In this example station B connected to SP 202 has ordered calls addressed to station B to be forwarded to station D which is connected to SP 206. An appropriate entry has been made in the customer record database of controller or central control point 250. In addition the end office (EO) 202 to which the call forwarding subscriber station B is connected has been programmed to recognize as a point in call (PIC) the signaling resulting from the dialing of the number for station B to trigger AIN type processing.

The dialing of the number for station B connected to SP 202 by station A 200 is handled pursuant to common channel signaling methodology. Since station B is not local to station A, i.e., the call cannot be handled through the same switch or switching system, the call must be completed through switching system or SP 202 in FIG. 11. As a result the SP 200 suspends the call and formulates and sends a common channel signaling message in SS7 protocol addressed to SP 202 for station B. This SS7 protocol message is sent to router 218. Router 218 encapsulates the SS7 message in TCP/IP format and provides optimum path addressing through the Internet 216 to the router 220 which is connected to the called station SP 202. The router 220 strips the TCP/IP addressing and delivers the SS7 message to SP 202. Call forwarding normally utilizes a destination trigger and thus SP 202 is programmed to contain a PIC to constitute this trigger.

When the SS7 message (IAM) is received at SP 202 the trigger is activated or tripped and SP 202 suspends call processing. SP 202 formulates a call data message in SS7 format and sends the message to its router 220. The SS7 message is addressed to the controller 250 in SS7 protocol. The router 220 encapsulates the SS7 message in TCP/IP format and provides optimum path addressing through the Internet 216 to the router (not shown) which is included as an interface to the controller 250. This router retrieves the SS7 message which is read by the controller. Assuming that the message includes sufficient data, the controller accesses its stored data tables and translates the received data into an SS7 call control message. In the event that additional information is needed the controller can instruct the particular SP to obtain and forward additional information. The SS7 address information from the received message is reversed pursuant to normal SS7 methodology described above. The SS7 response message formulated by the controller is then encapsulated for Internet TCP/IP transport by the router in the controller. This includes optimum path addressing through the Internet pursuant to TCP/IP protocol. The message formulated by the controller router has a destination address for the router 220.

When the TCP/IP message is received by the router 220 it is stripped to its SS7 content, i.e. the message from the controller. This SS7 message includes the forwarding number along with handling instructions for the SP. This information is transmitted from the SP 202 to the originating SP 200 in an inverse of the original signaling from SP 200 to SP 202. Thus the SS7 message is transported from SP 202 to SP 200 through the Internet via TCP/IP transport. When the originating SP 200 receives the message and the forwarding number the entire procedure is repeated to the destination station D connected to SP 206. If the called line or local link is available the call is connected or completed and a message to this effect is returned from SP 206 to SP 200.

In the foregoing example the signaling procedure was carried out completely through the internetwork or Internet without recourse to a signal transfer point (STP). While the signaling could have been carried out with routing through one or more STPs there is no necessity for following such a procedure where an STP is not addressed in the call processing signaling. The particular example involved a destination trigger and processing by the controller. In the case of the processing of an 800 number call an originating trigger is used and the STP may be provided with the necessary 800 to POTS number translation. In that event the originating SP communicates with the STP in a signaling methodology of the type described in the foregoing example.

In that methodology the SPs formulate their conventional SS7 messages. These are then transported via the internetwork using the internetwork protocol, which in the case of the Internet constitutes TCP/IP. It will be understood that the invention is not limited to use of the Internet as the internetwork nor limited to using TCP/IP protocol. However it is a feature and preferred embodiment to use the Internet in this capacity by virtue of its nature. The Internet is virtually worldwide in geographic extent and provides a developed and readily available transport medium. In addition to the foregoing the connectionless nature of message handling provides a high degree of redundancy for reliability purposes.

It is also a feature of the invention that reliability may be enhanced by an alternate arrangement which may serve as a substitute or supplement to the preferred example discussed above. According to this feature of the invention high capacity for signal handling may be obtained through an internetwork such as the Internet through the use of dedicated virtual paths. Such dedicated virtual paths can supply minimum guaranteed bandwidth and latency. This embodiment of the invention establishes dedicated virtual paths for large scale transport of packets along high traffic routes.

Figure 12:
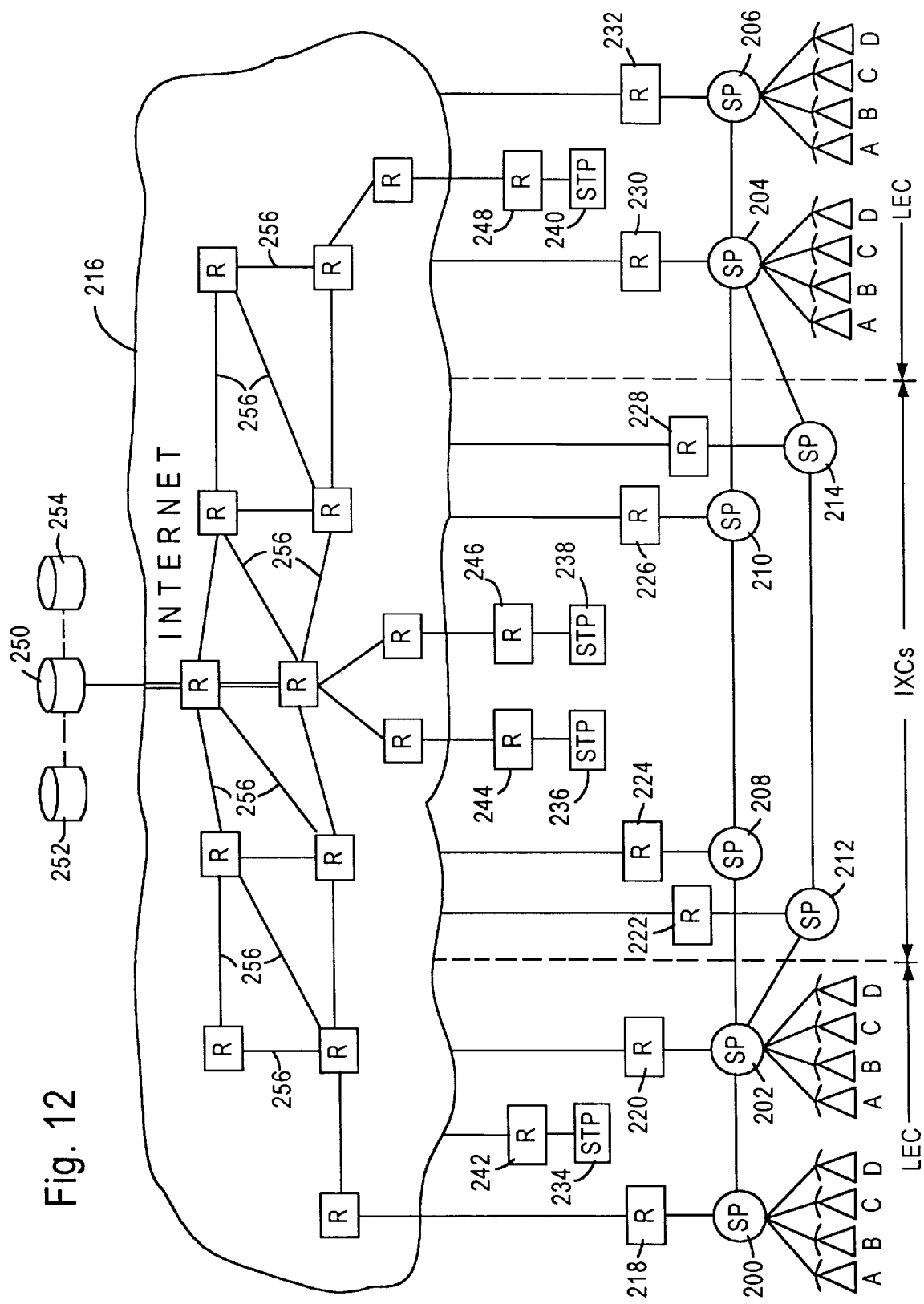
FIG. 12 shows a block diagram of a communication similar to that shown in FIG. 11 with a showing of an illustrative number of the routers in the Internet.

Referring to FIG. 12 there is shown a communication system similar to that shown in FIG. 11. In this illustration there are shown a portion of the routers contained within the Internet.

In simplified fashion the Internet may be viewed as a series of routers connected together with computers connected to the routers. In the addressing scheme of the Internet an address comprises four numbers separated by dots. An example would be 164.109.211.237. Each machine on the Internet has a unique number which constitutes one of these four numbers. In the address the leftmost number is the highest number. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This continues until the packet arrives at the destination computer. The separate packets that constitute a message may not travel the same path depending on traffic load. However they all reach the same destination and are assembled in their original order in a connectionless fashion.

Referring to FIG. 12 there are shown in the Internet 216 a series of routers R that route data packets along available paths 256 based on known algorithms. As known in the art, the separate packets that constitute a message may not travel the same path 256 depending on traffic load. However they all reach the same destination and are assembled in their original order in a connectionless fashion.

In order to provide guaranteed service quality and reliability certain packets between high traffic routers can be transported on dedicated virtual paths. The described example establishes dedicated virtual paths 258 for large scale transport of packets on selected high traffic routes. These are shown in FIG. 12 linking the STPs to the controller 250. Selected routers reserve a predetermined amount of bandwidth for these virtual paths. Such reservation is arranged by agreement between the telecommunication network operators and the Internet Service Providers (ISPs). While a complete dedicated virtual network could be arranged in this fashion the reliability has to be balanced against the cost of obtaining the dedicated paths.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A method of controlling a switched telephone network by common channel interoffice signaling comprising:

receiving and originating at a control point telephone network control signals having a first protocol;

receiving and originating at a service switching point telephone network control signals having said first protocol; and transporting said telephone network control signals between said control point and said service switching point over a public wide area packet switched network using a second protocol and wherein said public wide area packet switched network also transports data communications independent of telephone network control signals;

wherein said wide area packet switched network comprises the Internet.

2. A method according to claim 1 wherein said second protocol is the same protocol as used by said public wide area packet switched network for third party communications therethrough unrelated to said switched telecommunications network.

3. A method according to claim 1 wherein at least certain of said telephone network control signals comprise call set up and tear down signals.

4. A method according to claim 1 wherein at least certain of said telephone network control signals comprise transaction capability application part protocol messages.

5. A method of controlling a switched telephone network by common channel interoffice signaling comprising:

receiving and originating at a control point telephone network control signals;

receiving and originating at a service switching point telephone network control signals; and transporting said telephone network control signals between said service switching point and said control point over a public wide area packet switched network using a protocol different from any protocol used for said telephone network control signals and wherein said public wide area packet switched network also transports data communications independent of telephone network control signals;

wherein said public wide area packet switched network comprises the Internet.

6. A method according to claim 5 wherein at least certain of said telephone network control signals received at said service control point comprise transaction capability application part protocol messages.

7. A method according to claim 6 wherein at least certain of said telephone network control signals originated by and received at said service switching points comprise call set up and tear down messages.

8. A method according to claim 6 wherein said protocol used to transport said network control signals over said public wide area packet switched network is the same as the protocol used by said network to transport third party messages unrelated to said telecommunications network.

9. A method according to claim 8 wherein said protocol used to transport said network control signals over said public wide area packet switched network comprises TCP/IP.

10. A method according to claim 8 wherein said network control signals use SS7 protocol.

11. A method according to claim 5 wherein said network control signals originated and received at said service switching point and said network control signals originated and received at said signal transfer point and said signals originated and received at said service control point are transported via said public wide area packet switched network using a protocol different from any protocol used for said telephone network control signals using a protocol different from any protocol used for said telephone network control signals.

12. A communication system comprising:

a switched telecommunications network having an advanced intelligent network control system, said switched telecommunications network including switching systems connected by trunks;

said advanced intelligent network control system including service switching points associated with said switching systems, said service switching points originating and receiving control messages, and a service control point also originating and receiving control messages, said messages using a first protocol for controlling said switched telecommunications network; and a public wide area packet switched data network linking a plurality of geographically distributed interfaces for transport of data communications between said interfaces using a second protocol, as well as transport of data communications independent of said switched telecommunications network;

wherein communication of said messages to and from said service switching points uses said first protocol and is transported via said public wide area packet switched network using said second protocol; and wherein said public wide area packet switched data network comprises the Internet.

13. A communication system according to claim 12 wherein transport of data communications between said interfaces to said public wide area packet switched data network includes call set up and tear down messages.

14. A communication system according to claim 12 including one or more signal transfer points connected between said service control point and said service switching points.

15. A communication system according to claim 14 wherein transport of data communications between said interfaces to said public wide area packet switched data network includes call set up and tear down messages to and from said service switching points and said signal transfer point.

16. A communication system comprising:

a switched telephone network including service switching points linked to subscriber stations, said service switching points being interconnected by trunks for voice communication between subscriber stations, said service switching points being further interconnected by a signaling network operating through a signaling protocol for establishing voice communication connection;

a control node for controlling an operation of said switched telephone network through signaling between said control node and at least one of said service switching points using said signaling protocol; and a public wide area packet switched network for transporting data, including data communications independent of said switched telephone network, said public wide area packet switched network linking a plurality of geographically distributed interfaces thereto for transport of communications between said interfaces using a transport protocol, said control node being interconnected to said public wide area packet switched network through a first one of said interfaces, said signaling network being interconnected to said public wide area packet switched network through at least a second one of said interfaces;

wherein signaling between said control node and said service switching points using said signaling protocol is transported via said public wide area packet switched network using said transport protocol;

wherein said public wide packet switched network is the Internet.

17. A communications system according to claim 16 wherein said control node comprises a service control point.

18. A communication system according to claim 17, further comprising a signal transfer point connected between said service control point and said at least one service switching points.

19. A communication system according to claim 18 wherein said signaling to said service control point includes transaction capability application part protocol messages.

20. A communication system according to claim 16 wherein said signaling protocol is SS7 and said transport protocol is TCP/IP.

21. A method of controlling a switched telephone network by common channel interoffice signaling comprising the steps of:

originating at a service switching point in said network a first signaling message in a signaling protocol;

transporting said first signaling message to a service control point in said network through the Internet using an Internet transport protocol;

in response to receipt of said first signaling message at said service control point, originating a second signaling message for a designated destination service switching point;

transporting said second signaling message from said service control point through the Internet, using the Internet transport protocol, to said designated service switching point.

* * * * *